(12) United States Patent
Tanahashi et al.

(10) Patent No.: US 7,072,052 B1
(45) Date of Patent: Jul. 4, 2006

(54) EFFICIENT RASTERIZATION SYSTEM AND METHOD

(75) Inventors: Junichi Tanahashi, Irvine, CA (US); Denny M. Lin, Fountain Valley, CA (US); Fumiya Yamazaki, Shizuoka (JP)

(73) Assignee: Canon Kabushiki Kaisha, Tokyo (JP)

( * ) Notice: Subject to any disclaimer, the term of this patent is extended or adjusted under 35 U.S.C. 154(b) by 870 days.

(21) Appl. No.: 09/621,783

(22) Filed: Jul. 21, 2000

(51) Int. Cl.
  *H04N 1/40* (2006.01)
(52) U.S. Cl. ........................ 358/1.1; 358/1.13
(58) Field of Classification Search ................ 358/1.1, 358/1.4, 1.9, 1.13–1.14, 1.15, 1.16
  See application file for complete search history.

(56) References Cited

U.S. PATENT DOCUMENTS

| | | | | |
|---|---|---|---|---|
| 4,912,491 A | * | 3/1990 | Hoshino et al. ............. | 347/116 |
| 4,975,862 A | * | 12/1990 | Keller et al. ................. | 382/112 |
| 5,157,765 A | | 10/1992 | Birk et al. .................... | 395/163 |
| 5,222,200 A | | 6/1993 | Callister et al. ............. | 395/112 |
| 5,270,769 A | * | 12/1993 | Satoh et al. ................. | 399/301 |
| 5,301,089 A | * | 4/1994 | Takashima ................... | 361/744 |
| 5,412,483 A | * | 5/1995 | Ludlow et al. .............. | 358/401 |
| 5,557,297 A | * | 9/1996 | Sharp et al. ................. | 345/614 |
| 5,594,860 A | | 1/1997 | Gauthier ...................... | 395/501 |
| 5,652,711 A | | 7/1997 | Vennekens ................... | 364/514 |
| 5,787,240 A | | 7/1998 | Hansen et al. .............. | 358/1.16 |
| 5,819,038 A | * | 10/1998 | Carleton et al. ............. | 709/204 |
| 5,881,213 A | | 3/1999 | Shaw et al. .................. | 358/1.15 |
| 5,907,835 A | | 5/1999 | Yokomizo et al. ............. | 707/1 |
| 5,960,168 A | | 9/1999 | Shaw et al. .................. | 358/1.15 |
| 5,963,216 A | | 10/1999 | Chiarabini et al. .......... | 345/660 |
| 5,978,563 A | | 11/1999 | Kawamoto et al. .......... | 395/117 |
| 5,982,996 A | | 11/1999 | Snyders ....................... | 358/1.15 |
| 5,987,226 A | | 11/1999 | Ishikawa et al. ............ | 395/112 |
| 5,995,723 A | | 11/1999 | Sperry et al. ................ | 358/1.15 |
| 5,996,029 A | | 11/1999 | Sugiyama et al. ............ | 710/15 |
| 6,003,069 A | | 12/1999 | Cavill ........................ | 709/205 |
| 6,040,920 A | | 3/2000 | Ichiriki ....................... | 358/403 |
| 6,084,688 A | | 7/2000 | Stumbo et al. ............. | 358/1.17 |
| 6,336,124 B1 | * | 1/2002 | Alam et al. .................. | 715/523 |

* cited by examiner

*Primary Examiner*—Thomas D. Lee
*Assistant Examiner*—Stephen Brinich
(74) *Attorney, Agent, or Firm*—Fitzpatrick, Cella, Harper & Scinto

(57) ABSTRACT

An image processing method and system is provided wherein a plurality of processors perform a conversion process from a page description language format of data into raster image data, and a printing engine which continuously receives color image data having at least three color components in page unit and prints the at least three color components of color image data on a recording medium in parallel at a constant speed. A page description language format of data is received that includes at least two of the at least three color components as at least an object constituting the page description format data, the page description language format of data is analyzed and, based on the analysis, each color component data of the object in the received data is assigned to each processor such that the plurality of processors perform the conversion processes of the at least two of the at least three color components in parallel thereby producing raster image data of each color component from the plurality of processors to the printing engine in parallel.

19 Claims, 17 Drawing Sheets

| I.E., LETTER SIZE, 600 DPI | |
|---|---|
| SEGMENT 1 | SEGMENT 2 |
| SEGMENT 3 | SEGMENT 4 |
| SEGMENT 5 | SEGMENT 6 |

SINGLE PAGE OF MULTI-JOBS (COLOR)

J1 AND J3 ARE TEXT (BLACK AND WHITE)
J2 AND J4 ARE COLOR (C, M, Y, K).

EFFICIENT RASTERIZATION SYSTEM AND METHOD

BACKGROUND OF THE INVENTION

1. Field of the Invention

The present invention relates to a printing system including a plurality of processors performing a conversion process from a page description language format of data into raster image data, and a printing engine which continuously receives color image data having at least three color components in page unit and prints the at least three color components of color image data on a recording medium in parallel at a constant speed.

2. Description of the Related Art

Ink-jet and electro-photography color printers are becoming commonplace in recent years. Particularly, with electro-photography color laser printers, photosensitive drums are provided for each of the four colors of cyan, magenta, yellow, and black, color image data (color image data of the four colors, CMYK) is received from a host computer in increments of pages, and the color image data of the four colors is recorded on recording sheets almost simultaneously (in a parallel manner) at a constant speed. Such electro-photography color laser printers are generally called page printers, since image data is received in increments of pages, and the image data of the received one page is recorded at a constant speed. With such page printers, data in the format of what is generally called a Page Description Language such as PostScript (PS) or Printer Control Language (PCL) is received from a host computer, and the data in the Page Description Language format received by the page printer is rendered as Raster Image Data (i.e., rasterized) and recorded in increments of pages.

With conventional color printers, the processing for rasterizing consumes time in the case of Page Description Language format data containing color image data, with color image data containing large amounts of raw data in particular. Conventional rasterizing processing of Page Description Language format data has been a sequential process in increments of pages wherein at the point that the rasterizing processing for one page is completed, the flow moves to the rasterizing processing for the next page, so the recording of that page cannot be performed until the rasterizing processing for that page is completed and the color raster image data for that page is prepared, and meanwhile the printer is set to a standby state until the recording data is prepared, so consequently there has been a problem in that multiple pages of image recording cannot be performed at high speed in a continuous manner. Particularly, in the case of color page printers using photosensitive drums for the four colors of CMYK as described above, even though the printer might have capabilities for recording multiple pages of color image data at high speed in a continuous manner, the rasterizing processing has been time-consuming, so the printer capabilities have not been fully utilized. With color page printers currently being provided to the market, a speed of 3 pages per minute (or PPM) is the limit in the event of recording multiple pages of color image data in a continuous manner. A faster PPM rate may be achieved using a high-capability processor with a faster processing speed to increase the speed of the above rasterizing processing, but such high-speed processors are expensive, and this would consequently make the price of the printer very expensive.

Also, an arrangement is disclosed in U.S. Pat. No. 5,652,711, wherein, in the event of rasterizing Page Description Language format data, two sub-processors are used for executing translation processing of the data in increments of data stream segments, the data subjected to translation processing by the two sub-processors is synthesized so as to configure an intermediate data stream, following which the intermediate data stream is converted into bit map data, thereby increasing the speed of the rasterizing processing. However, the processing disclosed in U.S. Pat. No. 5,652,711 also performs sequential processing in increments of pages wherein the rasterizing processing for one page is completed and then the flow moves to the rasterizing processing of the next page, so in the event that color image data requiring time for the rasterizing processing is included partway through, the page printer goes on standby until the rasterizing processing for that page is completed, the same as with the above. Further, U.S. Pat. No. 5,652,711 makes no description whatsoever regarding increasing the speed of rasterizing processing for Page Description Language format data containing color image data.

SUMMARY OF THE INVENTION

Accordingly, it is an object of the present invention, in light of the above problems, to provide a system or method for efficiently performing rasterizing processing of Page Description Language format data containing color image data.

Further objects of the present invention will become more apparent from the following detailed description of the embodiments and the drawings.

DESCRIPTION OF THE PREFERRED EMBODIMENTS

The following is a detailed description of the embodiments of the present invention, with reference to the drawings.

Figure 1:
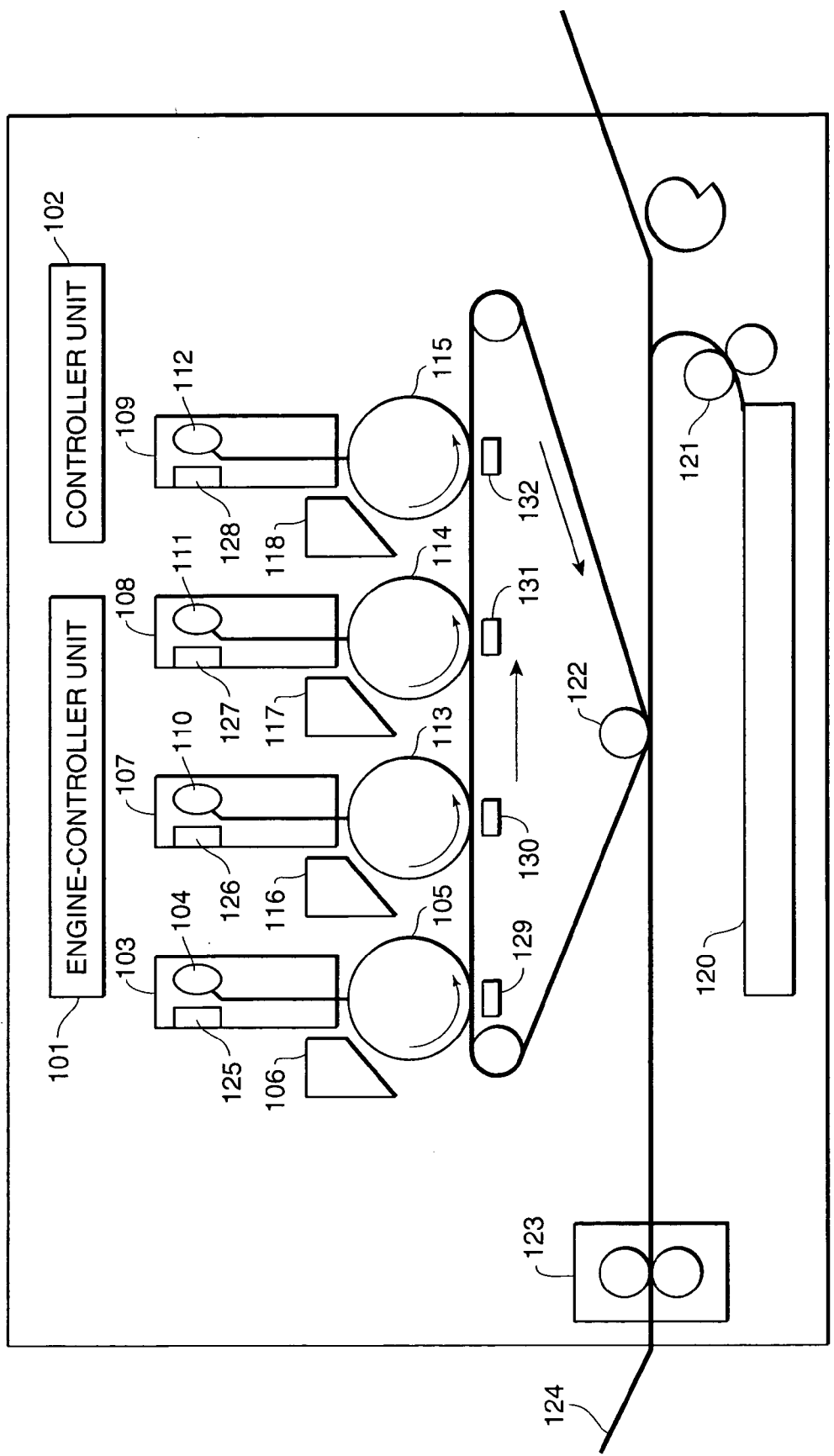
FIG. 1 is a diagram illustrating a schematic configuration of a printer according to an embodiment of the present invention.

FIG. 1 is a configuration view showing the overall configuration of a multicolor-image-forming apparatus according to a first embodiment of the present invention. The multicolor-image-forming apparatus uses toner in four colors of yellow, magenta, cyan, black; and it once primarily transcribes toner images onto an intermediate transcribing belt, then secondarily transcribes the images onto a recording sheet. The first embodiment outputs image data for each of the individual colors after a predetermined time passes from one vertical synchronizing signal used as a reference, thereby forming images in the individual colors with proper timing.

In FIG. 1, the symbol 101 denotes an engine-controller unit for controlling the total image-forming operation according to a printer engine (image-forming section; and the symbol 102 denotes a controller unit for supplying, for example, image data transferred from a host computer, to the engine-controller unit 101.

The symbol 103 denotes a Y laser-beam scanning system 103 for forming an electrostatic latent image corresponding to a yellow color. The symbol 125 denotes a Y rotational polygon mirror. The symbol 104 denotes a Y polygon-driving motor 104 for the Y rotational polygon mirror 125 for yellow colors. The symbol 105 denotes a Y photosensitive drum for yellow colors, which is optically scanned by the Y laser-beam scanning system to form an electrostatic latent image corresponding to a yellow color by using yellow toner. The symbol 106 denotes a Y developing section 106 for producing a visual image from the electrostatic latent image corresponding to the yellow color, which is formed on the Y photosensitive drum 105. The symbol 129 denotes a Y primary transcribing section for primarily transcribing the visual image for the yellow color onto an intermediate transcribing belt 119.

The multicolor-image-forming apparatus also has devices that are exactly the same as those for the described yellow-color-group image-forming section for color groups of magenta, cyan, and black. In specific, as devices for a magenta-color-group image-forming section, the multicolor-image-forming apparatus has an M laser-beam scanning system 107, an M rotational polygon mirror 126, and M polygon-mirror driving motor 110, and M photosensitive drum 113, an M developing section 116, and an M primary transcribing section 130. As devices for a cyan-color-group image-forming section, the multicolor-image-forming apparatus has a C laser-beam scanning system 108, a C rotational mirror 127, a C polygon-mirror driving motor 111, a C photosensitive drum 114, a C developing section 117, and a C primary transcribing section 131. As devices for a black-color-group image-forming section, the multicolor-image-forming apparatus has a K laser-beam scanning system 109, a K rotational polygon mirror 128, a K polygon-mirror driving motor 112, a K photosensitive drum 115, a K developing section 118, and a K primary transcribing section 132.

The Y primary transcribing section 129, the M primary transcribing section 130, the C primary transcribing section 131, and the K primary transcribing section 132 are, respectively, provided in positions opposing the lowest points of the Y photosensitive drum 105, the M photosensitive drum 113, the C photosensitive drum 114, and K photosensitive drum 115. Also, although presentation is omitted in the figure, the configuration includes drum-driving motors for individually rotating the Y photosensitive drum 105, the M photosensitive drum 113, the C photosensitive drum 114, and the K photosensitive drum 115; and it also includes a belt-driving motor for rotationally driving the intermediate transcribing belt 119.

The symbol 120 denotes a feeding-sheet cassette for accumulating recording sheets. The symbol 121 denotes a sheet-feeding roller for feeding the sheet in the feeding-sheet cassette 120 toward a secondary transcribing roller 122 that will be described later. The symbol 122 denotes the secondary transcribing roller for secondarily transcribing the visual image formed on the intermediate transcribing belt 119 onto the recording sheet. The symbol 123 denotes a fixing unit for fixing a secondarily transcribed image onto the recording sheet. The symbol 124 denotes an ejected-sheet tray.

Figure 2:
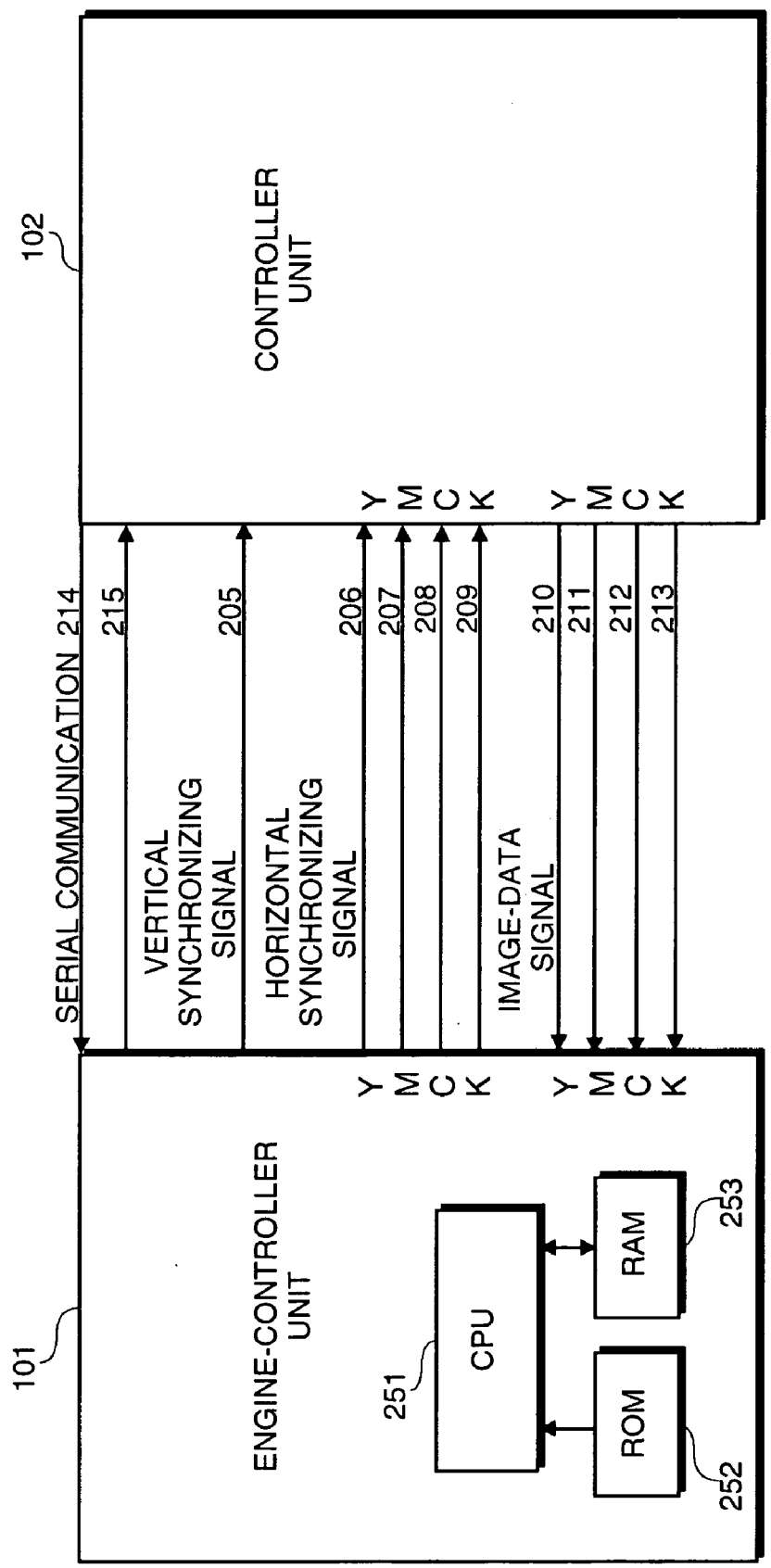
FIG. 2 is a diagram illustrating the connection wiring between the engine-controller unit 101 of the printer and the controller unit 102 of the present embodiment.

FIG. 2 shows signal lines to be used for transmitting and/or receiving various types of control signals and data between the engine-controller unit 101 and the controller unit 102 of the first embodiment.

The symbol 205 denotes a vertical synchronizing signal line for transmitting vertical synchronizing signals from the engine-controller unit 101 to the controller unit 102. The symbol 206 denotes a Y vertical synchronizing signal line for transmitting vertical synchronizing signals for yellow colors from the engine-controller unit 101 to the controller unit 102. The symbol 208 denotes a C vertical synchronizing signal line for transmitting vertical synchronizing signals for cyan colors from the engine-controller unit 101 to the controller unit 102. The symbol 209 denotes a K vertical synchronizing signal line for transmitting vertical synchronizing signals for black colors from the engine-controller unit 101 to the controller unit 102.

The symbol 210 denotes a Y image-data signal line for transmitting yellow-color image data signals from the controller unit 102 to the engine-controller unit 101. The symbol 211 denotes an M image-data signal line for transmitting magenta-color image data signals from the controller unit 102 to the engine-controller unit 101. The symbol 212 denotes a C image-data signal line for transmitting cyan-color unit 101. The symbol 213 denotes a K image-data signal line for transmitting black-color image data signals from the controller unit 102 to the engine controller unit 101.

Also, the symbols 214 and 215 denote a serial command signal line for transmitting command signals from the controller unit 102 to the engine-controller unit 101 by serial communication, and a serial status signal line for transmitting status signals from engine-controller unit 101 to the controller unit 102 by serial communication, in response to the commands.

Figure 3:
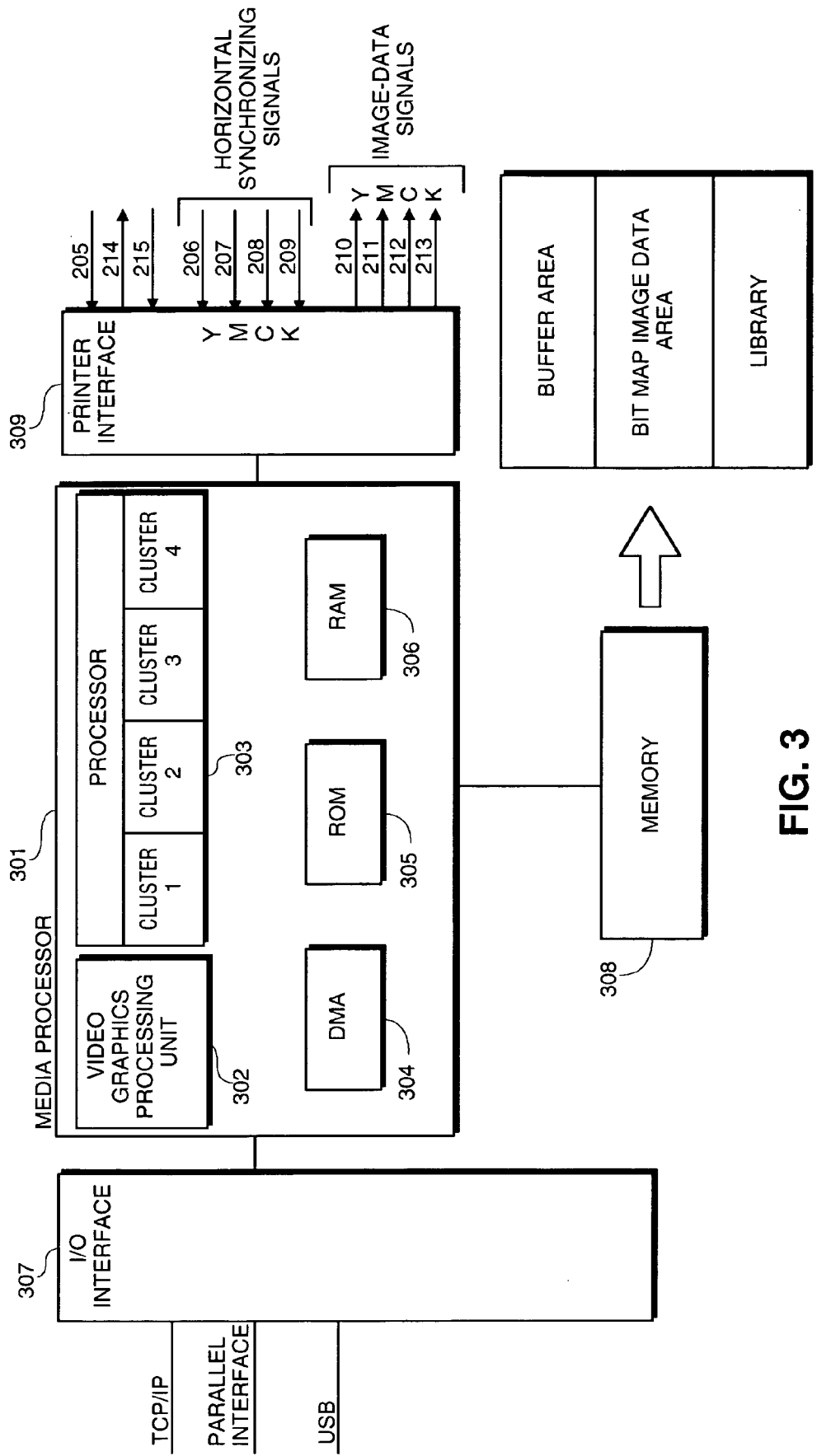
FIG. 3 is a block diagram illustrating the configuration of the controller unit 102.

Incidentally, the engine-controller unit 101 has a CPU 251, ROM 252, and RAM 253, with the CPU 251 following programs stored in the ROM 252 to execute the later-described various types of processing, while using the RAM 253 as a work area and the like. Also, the controller unit 102 has a media processor 301 which contains a video graphics processing unit 302, processor 303, DMA controller 304, ROM 305, and RAM 306, as shown in FIG. 3. Also, the processor 303 has multiple clusters 1, 2, 3, and 4, and each of these multiple clusters execute the processing appropriated to each in parallel according to programs stored in the ROM 305, while using the RAM 306 as work area. Detailed description of the controller unit shown in FIG. 3 and the processing executed by the media processor 301 will be given later.

Figure 4:
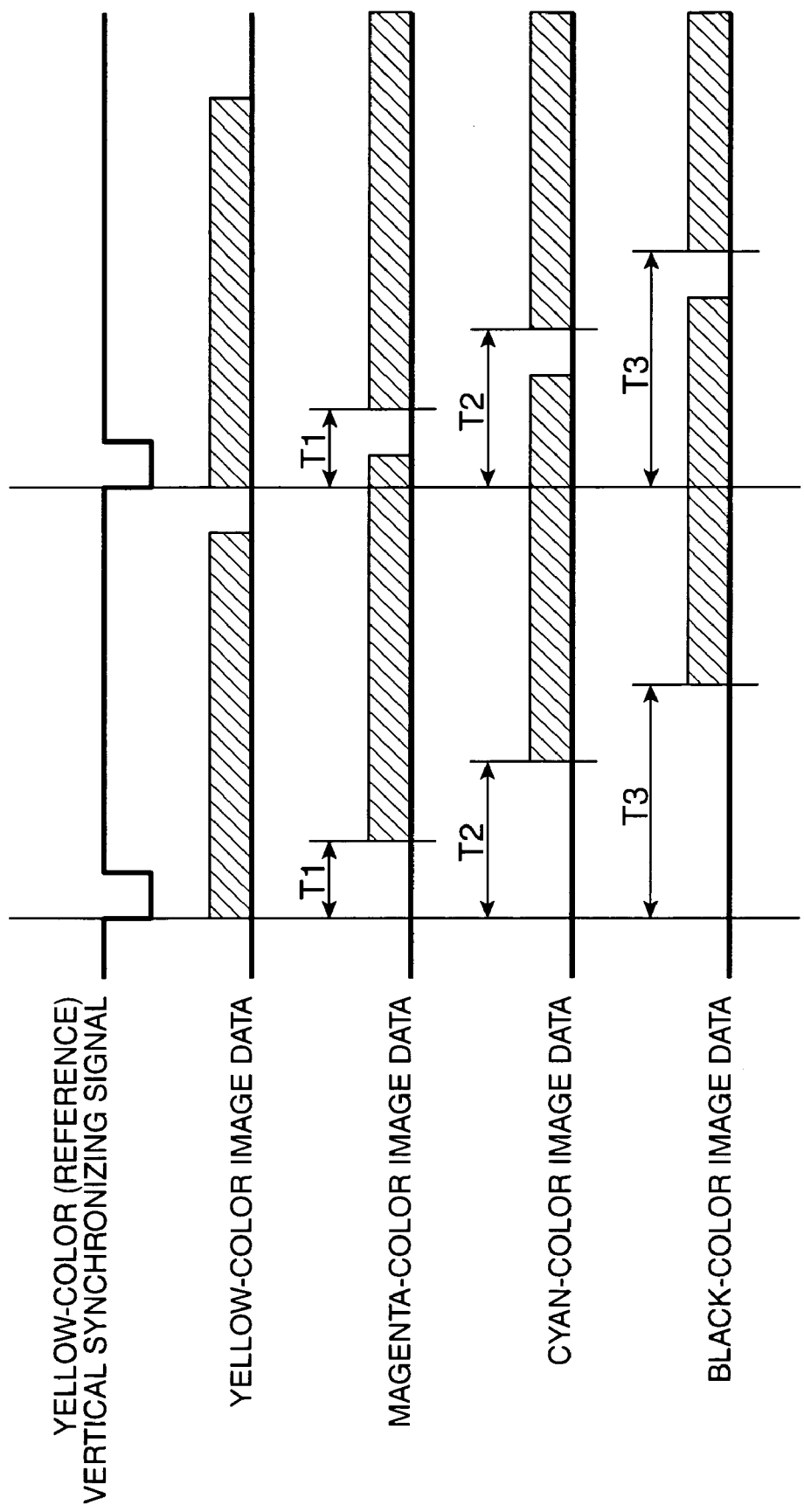
FIG. 4 is a timing chart illustrating the processing for transferring image data (bit map image data) from the controller unit 102 to the engine-controller unit 101.

In the present embodiment, as shown in FIG. 4, the controller unit 102 uses one reference vertical synchronizing signal line 205 shown in FIG. 2, outputs yellow image data to the engine controller unit 101 according to a reference vertical synchronizing signal obtained via the reference vertical synchronizing signal line 205; and after a predetermined time passes, it outputs other data, i.e., magenta-color image data, cyan-color data, and black-color image data.

In specific, upon receipt of a print-start command from, for example, a host computer (not shown), the controller unit 102 commands the engine-controller unit 101 to start printing operation. Upon start of the printing operation, drum-driving motors for rotationally driving the aforementioned photosensitive drums for the individual colors, the belt-driving motor for rotationally driving the intermediate transcribing belt 119, and the polygon-mirror driving motors 104, 110, 111, and 112 that correspond to the individual colors rotated.

Subsequently, when the number of revolutions of each of the polygon-mirror driving motors 104, 110, 111, and 112 reaches the lever of a stationary number of revolutions, the engine-controller unit 101 outputs a vertical synchronizing signal and a horizontal synchronizing signal for a first color of yellow to the controller unit 102, respectively, via the reference vertically-synchronizing signal line 205 and the Y vertical synchronizing signal line 206. In synchronization with the vertical synchronizing signal and the horizontal synchronizing signal, the controller unit 102 issues a yellow-color image data signal (in specific, the signal is a laser-beam ON/OFF signal) to the engine-controller unit via the Y image-data signal line 210.

As a result of the above the following image-forming operations are performed under the control of the engine-controller unit 101. Under the control of the engine-controller unit 101, the Y laser-beam scanning system 103 for yellow colors emits a laser beam according to the image data inputted from the controller unit 102 and forms an electrostatic latent image corresponding to the yellow color onto the Y photosensitive drum 105. Then, using yellow toner, the Y developing section 106 produces visual images from the electrostatic latent image formed on the Y photosensitive drum 105, and the Y primary transcribing section 129 primarily transcribes the yellow-color visual image formed on the Y photosensitive drum 105 onto the transcribing belt 119.

With timing when the yellow-toner visual image transcribed on to the intermediate transcribing belt 119 passes the lowest point of the M photosensitive drum 113 for magenta colors, the controller unit 102 outputs yellow-color image data; and after a predetermined time (TI shown in FIG. 3) passes, it outputs magenta-color image data to the engine-controller section 101 via the M image-data signal line 211 so that a magenta-toner visual image arrives at the lowest point of the M photosensitive drum 113 for magenta colors.

Subsequently, the M laser-beam scanning system 107 for magenta colors emits a laser beam according to the magenta-color image data inputted from the controller unit 102 and forms an electrostatic latent image corresponding to the magenta color onto the M photosensitive drum 113. Then, using magenta toner, the M developing section 116 produces a visual image from the electrostatic latent image formed on the M photosensitive drum 113. Subsequently, the M primary transcribing section 130 arranges the magenta-color visual image formed on the M photosensitive drum 113 to be completely fitted to the yellow-color visual image, then primarily transcribes the images onto the intermediate transcribing belt 119.

Similarly to the magenta visual image, a cyan-color visual image and a black-color visual image are also primarily transcribe onto the intermediate transcribing belt 119. That is, after outputting the yellow-color image data, the controller unit 102 individually outputs cyan-color image data and black-color image data to engine-controller unit 101, respectively, via the C image-data signal line 212 and the K image-data signal line 213 after individual predetermined times pass (T2 and T3 shown in FIG. 4). Thereby, the four-color images are transcribed onto the intermediate transcribing belt 119 so as to be completely overlapped.

In other words, according to the controller unit 102, the reference vertical synchronizing signal is inputted, yellow-color image data is outputted, and the predetermined time passes; thereafter vertical synchronizing signals for the magenta, cyan, and black colors are assumed to have been inputted, and magenta-color image data, cyan-color image data, and black-color image data are sequentially outputted; and images in four colors can thereby be formed with proper timing only with a single reference vertically-synchronizing signal line 205. In this way, by reduction in the number of signal lines, noise can be reduces and price reduction can be achieved.

To feed a recording sheet from the feeding-sheet cassette 120 according to the sheet-feeding roller 121, and engine-controller unit 101 allows the recording sheet to be fed with timing so that the end of the image (including a margin area) formed on the intermediate transcribing belt 119 arrives just at the end of the recording sheet and the image on the intermediate transcribing belt 119 arrives just at the end of the recording sheet and the image on the intermediate transcribing belt 119 is secondarily transcribed properly onto the recording sheet by the secondary transcribing roller 122.

Next, the configuration of the controller unit 102 will be described.

FIG. 3 is a block diagram illustrating the detailed configuration of the controller unit 102.

In the Figure, the symbol 301 denotes a media processor, and has multi-processing functions whereby independent processing can be executed in parallel, by the above-mentioned multiple clusters 1, 2, 3, and 4. With the present embodiment, the clusters 1 through 4, and the computer program for the rasterizing processing of Page Description Language format data to be executed by the clusters, make up the RIP (Raster Image Processing) engines for rasterizing, with four RIP engines being realized in the present embodiment by using the processor 303 which has four clusters which can be executed independently and in parallel. However, the number of RIP engines may be increased, by using a processor which has even more clusters, or adding processors having the same configuration as this processor 303.

Also, the media processor 301 has a video graphics processing unit 302. This video graphics processing unit 302 originally functions to generate video data for displays. With the present embodiment, data other than Page Description Language format data, such as Microsoft application software Word, Excel, PowerPoint, and other like file data, is received from a host computer or a terminal on a network as GDI (Graphic Display Interface) data, and the received GDI data is rendered as raw image data by the video graphics processing unit 302. Such GDI data is rendered as raw image data with the same processing as for displaying on a monitor screen, but this video graphics processing unit 302 is originally designed for generating video data for displays, so the data amount (size) of the raw image data generated by the series of processing turns out to be a size for displaying, which is different to the image data amount (size) to be recorded by the printer. Accordingly, with the present embodiment, a processing is employed wherein one page of data is rendered at the video graphics processing unit 302 as follows. One page of data is divided into several segments (blocks), these are rendered as raw image data by the video graphics processing unit 302 in increments of segments (i.e., in the increments of the blocks which the data has been divided into), following which the rendered blocks of raw image data are synthesized (joined) at a later-described assembler processing unit, thereby generating one page of raw image data. The video graphics processing unit 302 of the media processor 301 allows the clusters 1, 2, 3, and 4 of the processor 303 to execute processing independently and in parallel, thereby allowing the processor 303 to mainly concentrate on rasterizing Page Description Language format data. Also, the above-described GDI format data is processed by a processing unit (video graphics processing unit 302) other than the processing unit (processor 303) for rasterizing the Page Description Language format data, so in the event of performing processing with the processor 303 which is designed to perform rasterizing of all Page Description Language format data, there is no need to perform Page Description Language format analysis processing and the like which is executed as pre-processing for actual rasterizing processing, and thus the overall rasterizing processing can be executed efficiently and at high speed. Further, with the present embodiment, a dedicated processing (XML formatter process) for rendering XML (Extensible Markup Language) format file data, which is a data format developed for Web use on the Internet, into raw image data is provided, and in the event that the processor 303 judges that the data received from a host computer or a network is XML format data, XML format data can be rendered into raw image data by this dedicated XML formatter processing step, so there is no need for Page Description Language format analysis processing and the like as with the processing of GDI format data with the above video graphics processing unit 302, meaning that the overall rasterizing processing can be executed efficiently and at high speed.

Also, symbol 304 denotes a DMA (Direct Memory Access) controller, used for processing such as automatically storing printing file data received from the interface 307 to a specified buffer area of the memory 308, transferring printing bit map image data rendered by the rasterizing processing and stored in the bit map image data storing area of the memory 308 to the engine-controller unit 101 of the printer via the printer interface 309, and so forth.

Symbol 305 denotes a ROM (Read-Only Memory) storing computer programs and the like to be executed by the video graphics processing unit 302 and the processor 303, and symbol 306 denotes RAM (Random Access Memory) used as for storing various types of data or as the work area of the processor 303.

Symbol 307 denotes an interface unit having functions for executing via parallel interfaces (e.g., parallel interfaces according to IEEE 1284 and 1394 stipulations), serial interfaces such as USB (Universal Serial Bus), TCP/IP communications via a physical interface, and wireless communication functions such as wireless LAN and the like, with the interface unit 307 receiving printing file data of various formats such as described above from a host computer connected one-on-one or a terminal on a network, the received file data being stored in the buffer area of the memory 308 by the media processor 301.

Also, the memory 308 has provided therein a buffer area (which may vary in capacity or size, but may have, for example, a capacity of around 20 to 30 Megabytes) for storing file data (printing data) of various types received from the host computer or terminal on the network via the interface unit 307, and a bit map image data area for storing the rendered bit map image data (capacity in the order of several tens of Megabytes and capable of storing two to several pages of bit map image data, though the actual amount of bit map image data changes according to the data size, resolution, valid data amount, and so forth), and the memory 308 stores various types of reference data (library) referred to in the event of rendering Page Description Language format data, GDI format data, and XML format data, into raw image data.

Figure 5:
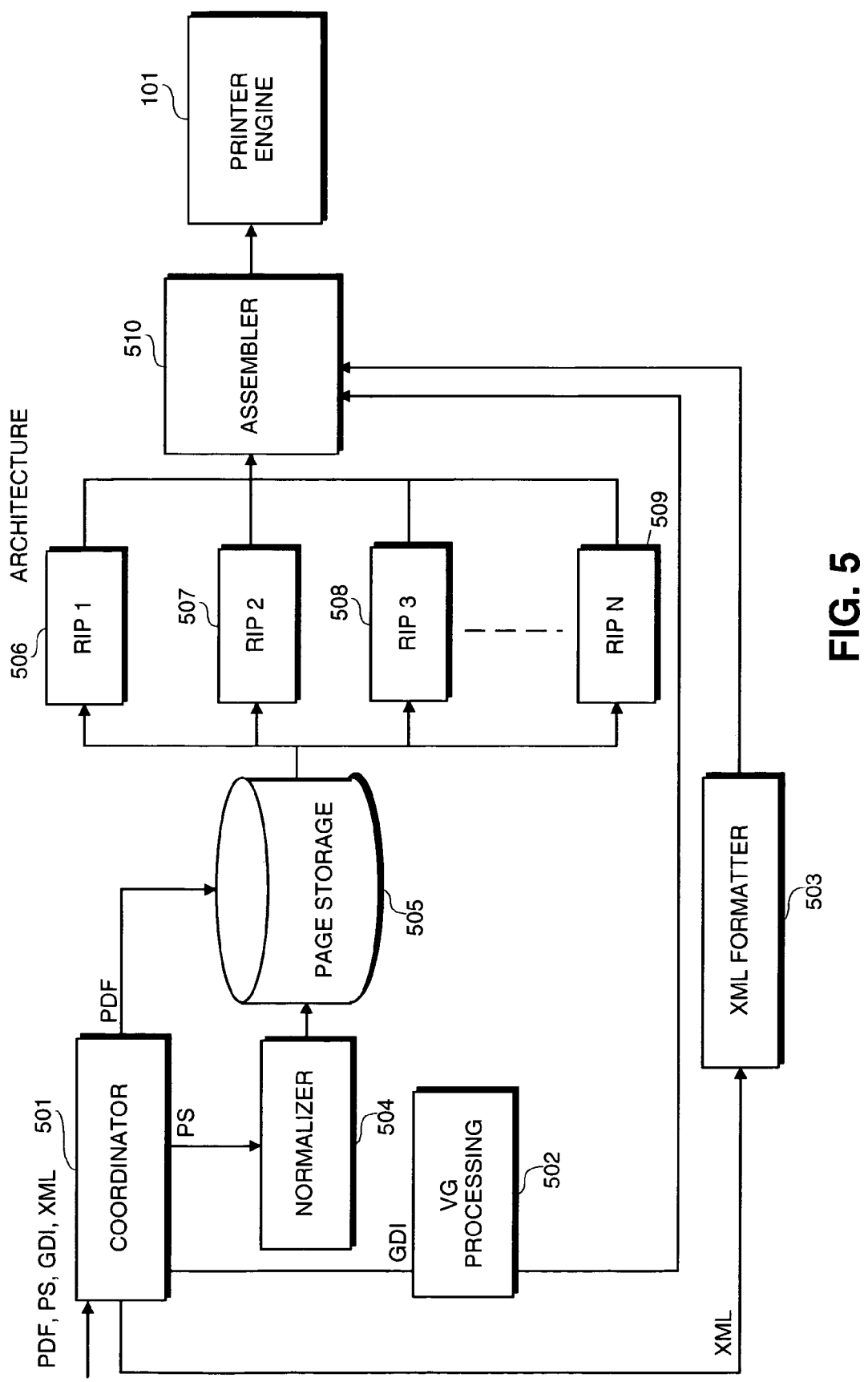
FIG. 5 is a diagram illustrating the architecture of the rasterizing processing executed by the controller unit 102.

FIG. 5 is a diagram illustrating the basic architecture for executing the rasterizing processing for the various types of file data to be printed, executed by the media processor 301 in the present embodiment. This rasterizing process according to the present embodiment will be described with reference to this FIG. 5. The architecture illustrated in FIG. 5 is realized by the media processor 301 and memory 308, and control programs executed by the media processor 301 and stored in the ROM 305.

First, the file data received from the interface or network via the interface unit 307 is sent to the coordinator 501, where the attribution information (file header and tag information) indicating the attribution and data configuration and the like of the file data at the head portion of each set of file data is analyzed, and judgement is made regarding which type of file data this is, i.e., whether PS (PostScript) and PDF (Page Description Format), the aforementioned GDI format, or XML format.

Figure 6:
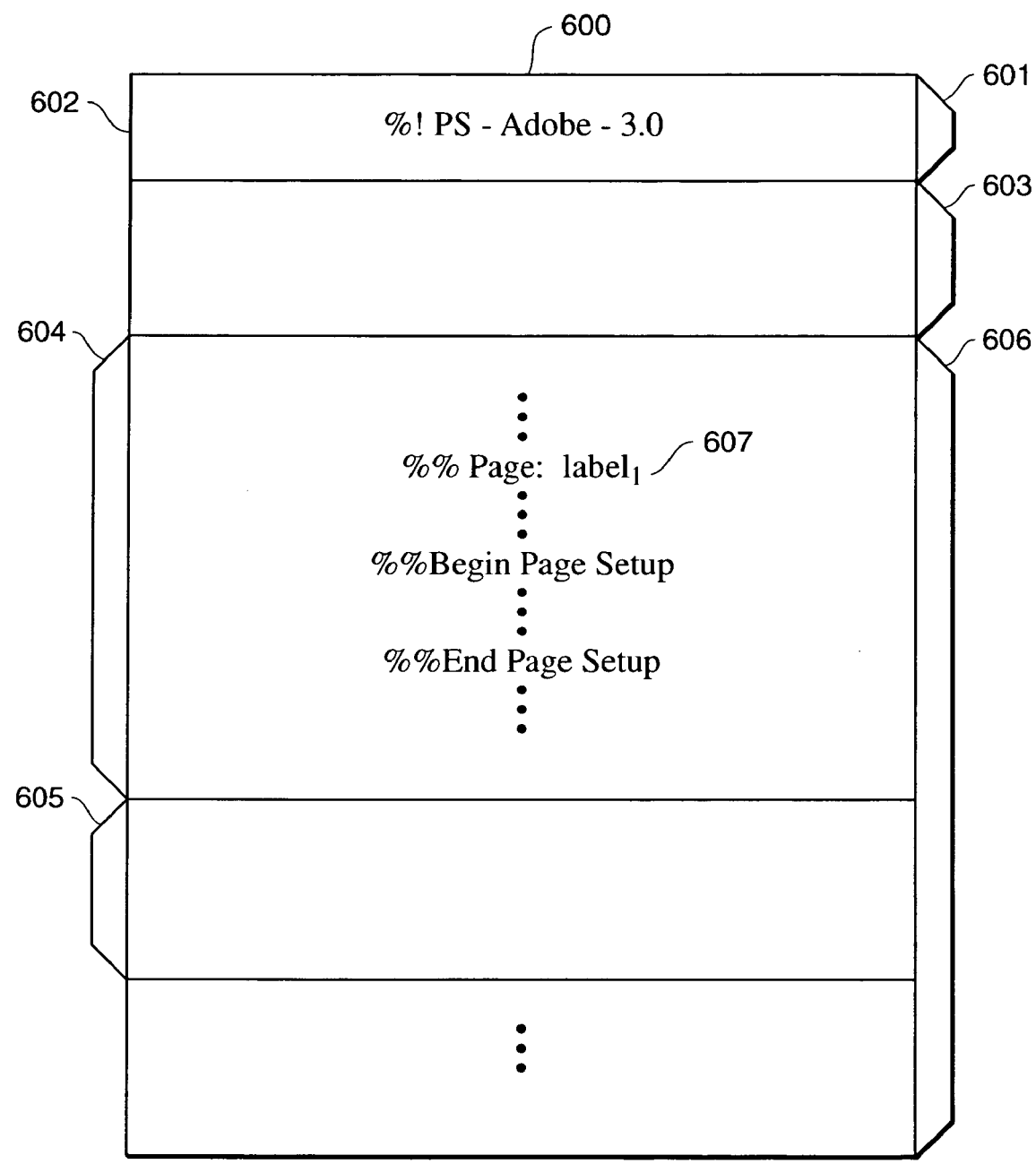
FIG. 6 is a diagram illustrating attribution information of PostScript file data.

Referring to FIG. 6, for example, a format of PostScript data is provided for the sake of illustration. The format of PostScript (or PS) data is well known in the art and, therefore, a brief description is given herein. Data 600 includes header 601, Setup 603 and page 606 portions.

Entry 602 of header 601 includes a string identifying data 600 as including PS data. As illustrated in entry 602, it is typical for a data format entry to include a "special" or reserved character string comprised of one or more characters that identify a command or other syntax of the format language. For example, entry 602 includes "%!" that may be used to determine that the entry contains a label or other designation of the format and/or contents of data 600 (e.g., version 3.0 PostScript data).

Data 600 further comprises setup 603 that includes, for example, definition and/or setup information such as procedure definitions and document setup. Setup 603 may further include customized color definitions, e.g., a definition of a custom color specified by a name and, where the color is defined in the CMYK color space, the four color component definitions.

Page 606 defines each page of a PostScript document defined in data 600. For example, page definitions 604 and 605 each contain a page definition. Referring to page definition 604, for example, a special character string (i.e., "%%") denotes the start of a comment or other syntax used in the PostScript language format. Entry 607 includes a label, or name, portion for assigning a name to a page defined in page definition 604. Page definition 604 may define an object (or objects) that contains color data. For example, it is possible that an object definition identifies a customized or other color definition. As is described in more detail below, a page may be divided into one or more jobs based on the objects contained in the page and whether or not an object is a color object.

Another well known printer definition language (which was developed by Hewlett Packard), PCL, like PostScript, uses a format (including command escape sequences) such that it is possible to identify a file as containing a PCL definition, and contains definitions of a page and objects within a page. An extension of PCL, HP-GL (and HP-GL/2) provides additional graphics functionality definitional capability and may be used to define an object having color components.

In a case of an XML formatted file, a code (or tag) such as "?xml" is contained in the file to identify that the data contained therein is XML data. This code is typically the first part, or header portion, of the file. Thus, it is possible to analyze the first part of a file, and where the "?xml" tag is present, determine the file to contain XML data. Similarly, a file may be determined to be a windows metafile that includes a series of instructions for a Graphics Device Interface (GDI) by analyzing a first portion of the data contained therein for the presence of a metafile type in a header portion of the file.

Referring again to FIG. 5, in the event that the received data is PS format data, this is sent to a normalizer 504, and in the event that the received data is PDF data, the normalizer 504 is skipped and sent to the page storage 505. Also, in the event that the received data is GDI format data, this is sent to video graphic processing 502 by the video graphics processing unit 302, and in the event that the received data is in the XML format, this is sent to the XML formatter 503. In the present embodiment, the coordinator 501 judges the attribution information (tag information) contained in the received file data, and selection is made regarding which processing unit to perform the rasterizing processing with, so even in the event that various types of file data are received as a series of printing information, the printer side can automatically select the optimal rasterizing processing unit with the present embodiment, so there is no need to instruct the type of file data as a print instruction command from the host computer or terminal on the network separately from the file data. All that the host side needs to perform is to simply transfer the print request and the printing data to the printer as it is. Thus, optimal rasterizing processing can be realized regarding a series of printing data wherein various types of file data are intermingled. Also, with the present embodiment, in the event that the received data is other than a Page Description Language format, a dedicated rasterizing processing unit (the video graphics processing unit 502 or XML formatter 503) configured other than the processing unit for performing rasterizing processing for Page Description Language format data renders the received data into raw image data, thus enabling high-speed and efficient rasterizing processing.

Also, at the normalizer 504, the received PS format code data is converted into a general PDF. The processing of this normalizer 504 is well known, so description thereof will be omitted here. The data converted into a PDF format by this normalizer 504 is sent to the page storage 505 from the coordinator 501 in the same manner as the PDF data sent to the page storage 505.

At the page storage 505, the attribution information (tag information) of the sent PDF data is analyzed. The PDF data is configured in increments of jobs. For example, in the event that one page of data is made up of three objects, that page is configured of three jobs, and each job has attribution information (command type, data amount, information of position on page of the object, and so forth) for that object. In the event that an object contains color data, and that data has CMYK data, the attribution information for that object is further divided into each of C, M, Y, and K. With conventional system, one object is subjected to rasterizing processing by one RIP engine, so the processing for each of C, M, Y, and K is executed by one RIP engine in a sequential manner. Accordingly, there has been a problem that, in the event that rasterizing processing is performed for objects containing color data with large amounts of data in particular, a great amount of time is required. With the present embodiment, in the event that the page storage 505 judges that the job to be processed contains a color data object, the job is sub-divided into processing of the color components C, M, Y, and K, the sub-divided processing is appropriated to each of the multiple RIP engines, and rasterizing processing is performed with the multiple RIP engines in parallel, thereby realizing high-speed rasterizing processing of color data.

Also, conventionally, the arrangement involved the flow moving to the rasterizing processing of the next page only after the rasterizing processing of one page had been completed, but with the present embodiment, processing is not performed such that the page storage 505 confirms the completion of one page of rasterizing processing and then moves to the next page of rasterizing processing; rather, the received jobs are sequentially appropriated to RIP engines, so for example, in the event that there are multiple pages and the data on each page is made up of objects of a single type, the multiple pages are subjected to rasterizing processing by the multiple RIP engines in parallel. That is to say, with the present embodiment, multiple RIP engines are caused to be running at all times, so RIP engine operation can be carried out more efficiently, and thus high speed can be realized. Specifically, a queue is provided to each RIP engine for storing jobs appropriated to the RIP engine, and further, the estimation time information for the completion of that appropriated job is stored in that queue, based on the contents of the job commands, the amount of data, and the processing speed of the clusters. In the event that multiple jobs are appropriated to a single queue, the estimation time for each job is added, and the totaled estimation time information is stored in that queue. At the time of appropriating jobs to the multiple RIP engines 506 through 509, the page storage 505 makes reference to the accumulated estimation time information stored in the queue of each RIP engine, selects the queue with the smallest accumulated estimation time information, and appropriates the job to the selected queue. In the event that there is a queue to which no jobs have been appropriated at all (i.e., the RIP engine is standing idle), the accumulated estimation time information is zero, and in the event that there is such a queue, the job is appropriated to that queue. Once a job is appropriated to a queue corresponding to the RIP engine, that RIP engine reads out the attribution information (including command information) of that appropriated job from the queue, and executes rasterizing processing of the read job data. The bit map image data rendered by the RIP engines is sent from each RIP engine to the Assembler 510 along with the attribution information (including page number and position information) of that object.

At the assembler 510, the received bit map image data is stored on the corresponding page and at the position within the corresponding page in the bit map image data area within the memory 308, based on the attribution information (including page number and position information within the page) received at the same time. With the processing based on the present embodiment, for example, in the event that the first page is a page containing as an object color data which has an extremely great amount of data, and the second page is text data, the storage of the bit map image data for the second page may be completed before of the bit map image data for the first page is all in place (i.e., before all bit map image data is stored in the area for the first page in the bit map image data area), but the assembler 510 manages the page to be output to the engine-controller unit 101, and upon confirming the completion of the bit map image data of the page to be output, starts the transfer processing of that page data to the engine-controller unit 101. Then, at the point that the transfer of that page data to the engine-controller unit 101 ends and a notification of completion of recording (proper recording) is received from the engine-controller unit 101, the area for that page in the bit map image data area in the memory 308 is released, thus allowing storing of subsequent page data. Also, the assembler 510 manages the storable area of the bit map image data storing area in the memory 308, and secures memory capacity necessary for storing each page data in the order of pages to be printed, based on the page management information for each file, and at the point that printing is completed releases the memory area for that page. Basically, even in the event of pages containing as objects color data with great amounts of data, the object is sub-divided into the color components and dispersed to multiple RIP engines for rasterize processing, so even in the event that pages are out of order at the time of completion of the rasterizing processing, this is contained within a range of a few pages, so there will be no problem in particular as long as storage capacity for several pages of bit map image data is provided.

Also, the video graphics processing 502 performs rendering processing of GDI format data, using the video graphics processing unit 302. This video graphics processing will be described later in detail.

Also, the XML formatter 503 performs rendering processing of XML format data sent from the coordinator 501.

The rendering processing of data by this XML formatter 503 is realized by control programs stored in the ROM 305 being executed by the processor 303. The rendering processing of XML format data itself is well known, so detailed description thereof will be omitted here.

FIGS. 7 through 11 are flowcharts illustrating the processing action executed by the media processor 301 according to the present embodiment. The processing executed by the media processor according to the present embodiment will now be described in detail, with reference to the flowcharts shown in FIGS. 7 through 11.

Figure 7:
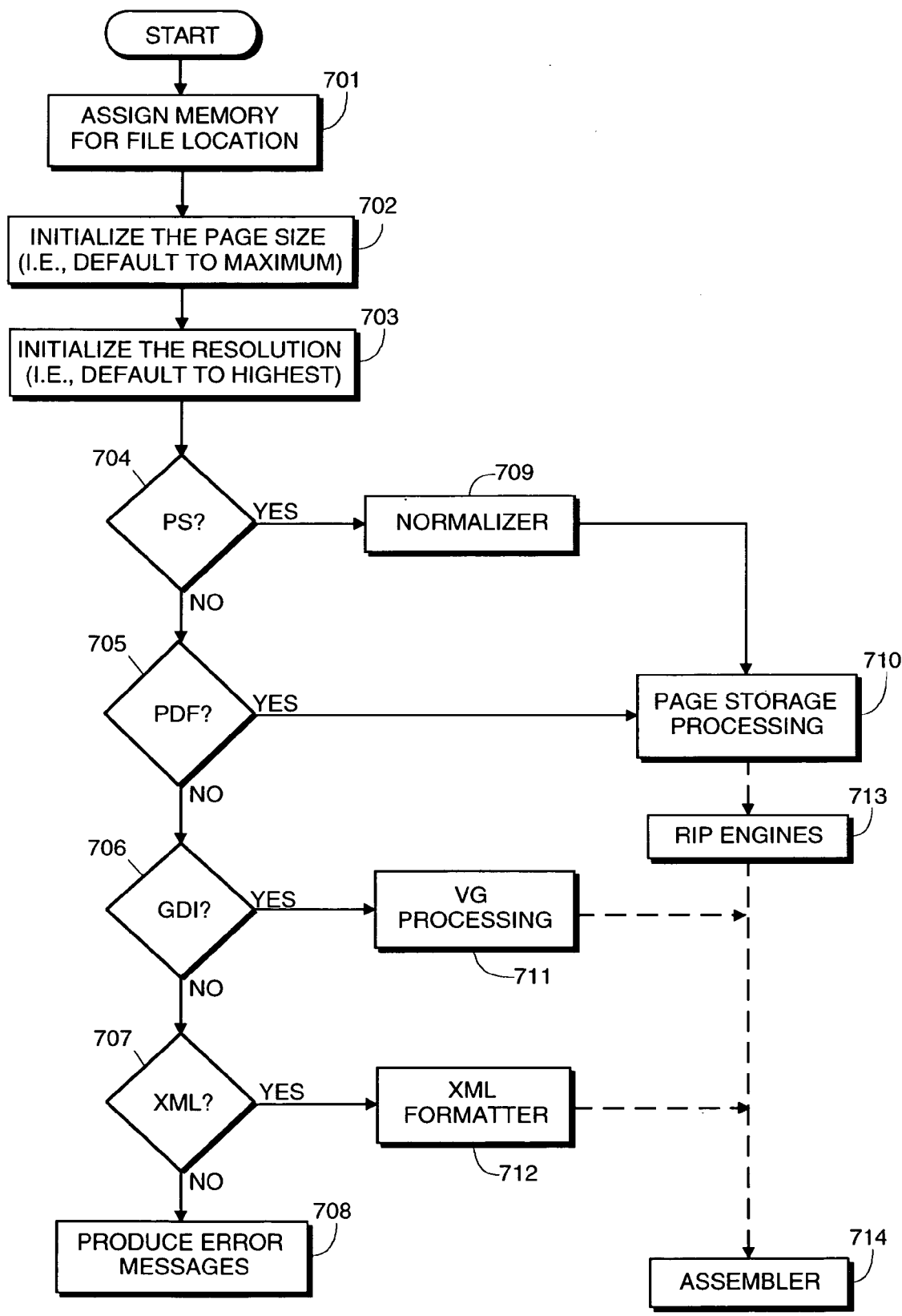
FIGS. 7 through 11 are flowcharts illustrating the various types of processing operations for the rasterizing processing executed by the media processor 301 of the controller unit.

FIG. 7 illustrates the processing of the media processor 301 according to the present embodiment, with the processing indicated by steps 701 through 708 corresponding to the coordinator 501 shown in FIG. 5, and the normalizer in step 709 is for enabling rasterizing processing with common RIP engines by converting the PS format into PDF which is a common Page Description Language format, as described with the normalizer 504 shown in FIG. 5. The processing executed by this normalizer 709 is analyzing the attribution information (file header and tag information and the like) of the received PS format data, and classifying the objects of the jobs making up of the received PS format data (e.g., vector data, raster data, and so forth). Then, the format unique to PS is converted to a common PDF. The processing of the normalizer 709 here is well known, as already mentioned, so detailed description thereof will be omitted here.

The processing of the coordinator 501 in the steps 701 through 708 is executed by the processor 303. In order to store the file data received via the interface 307 in the buffer area of the memory 308, the processor 303 in step 701 assigns a storage position in the buffer area of the memory 308, and causes the DMA controller 304 to sequentially store the received data in the specified buffer area of the memory 308 by DMA processing. The DMA data transfer processing specifies the storage area in units of blocks, and in the event that the available area in the buffer area of the memory 308 runs out, the processor 303 notifies the host computer or terminal on the network which is sending the data of a temporary stop in data transfer; at the point that the recording of the data by the rasterizing processing and the print engine is completed, the buffer area storing the data thereof is sequentially released, and when available space is generated in the buffer area, the interrupted data transfer from the host computer or terminal on the network is resumed.

In steps 702 and 703, following initializing the page size and resolution of the printing data, the processor 303 reads out the attribution information including the file header and tag information of the received file data stored in the specified buffer area of the memory 308 and judgement is made regarding the type of file format, number of pages, and page configuration, of the received data.

The processor 303 judges in step 704 through 707 whether the data format of the received file data is PS, PDF, GDI, or XML, and in the event that this is PS format data, the above-described normalizer processing is executed in step 709 and then the page storage process is activated in step 710, starting the processing of the data converted into PDF by the normalizer processing. Also in the event that judgement is made that the received file data is PDF (a common Page Description Language format such as PCL) in step 705, the processor 303 activates the page storage process in step 710 without performing normalizer processing, and starts the data processing.

Or, in the event that the processor 303 judges in step 706 that the received file data is a GDI format, the video graphics processing is activated in step 711, starting the rendering processing (rasterizing processing) of the GDI format data.

Or, in the event that the processor 303 judges in step 707 that the received file data is an XML format, the XML formatter processing is activated in step 712, and the rendering processing of the XML format data is started by the XML formatter processing. The XML formatter processing is task processing executed by the processor 303. Incidentally, the above page storage process (step 710) and assembler processing in step 714 are also task processes executed by the processor 303, and these task processes (including XML formatter processing) are executed in parallel by multi-tasking. Also, each RIP engine processing executed using the clusters 1, 2, 3, and 4 of the processor 303, executes independent and parallel rasterizing processing under the control of the processor 303. In the XML formatter processing in step 712, the attribution information (including file header and tag information) of the XML format file data received from the buffer area of the memory 308 is read out and analyzed, the tag information of each object making up the file data is decoded, and the XML format data is rendered as bit map image data. Thus, the bit map image data of the rendered XML format data is temporarily stored in the work area of the RAM 306, and stored in the specified area in the bit map image data area of the memory 308 based on the page management information compiled by the coordinated and the tag information corresponding to the rendered bit map image data, by the assembler processing in step 714. Incidentally, the XML format processing is a well-known processing, and thus detailed description will be omitted here.

Figures 8, 12:
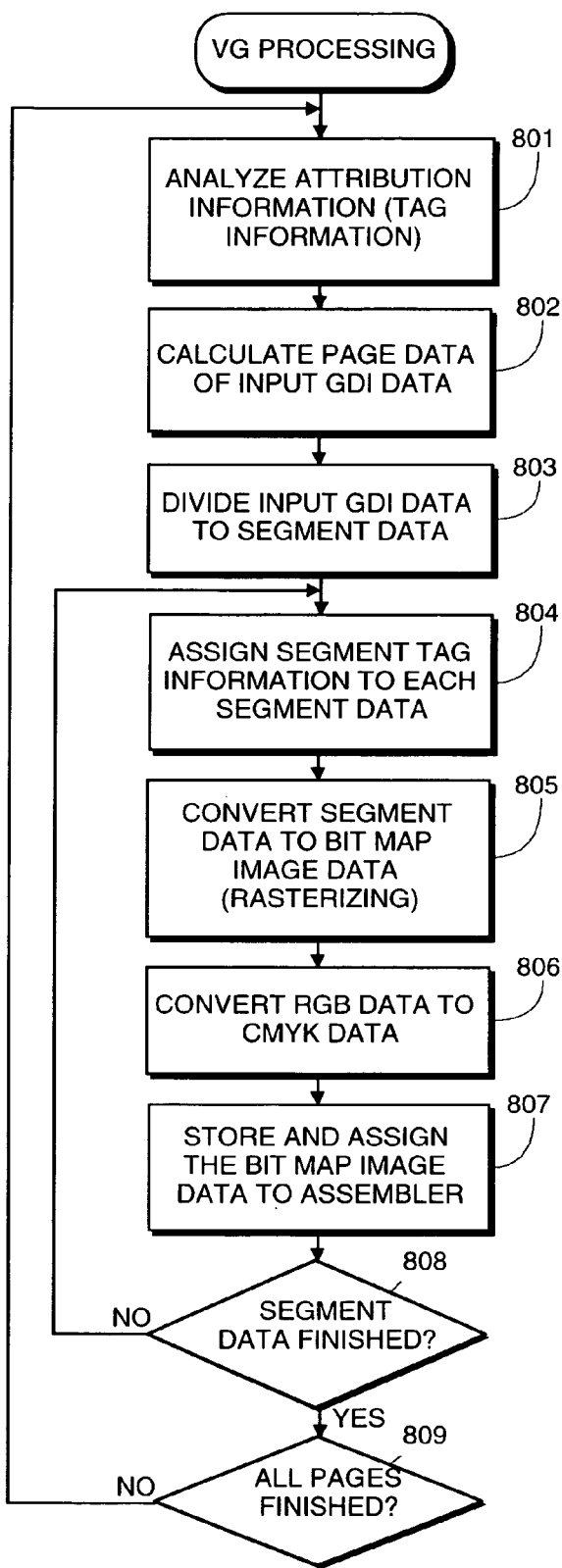
FIG. 12 is a diagram illustrating an example of segmenting, for a case wherein one page of data is divided into multiple segments and subjected to rasterizing processing by the video graphics processing according to the present embodiment.

FIG. 8 is a flowchart illustrating the video graphics processing executed by the video graphics processing unit 302 of the media processor 301, and the processing of this video graphics processing unit 302 is executed under control of the processor 303 and is activated by the processor 303.

In step 801, the video graphics processing unit 302 analyzes the attribution information (including file header and tag information) of the received GDI format data stored in the memory 308. Then, in step 802, the video graphics processing unit 302 calculates the data amount of the printing data for one page, based on the printing size and resolution information specified at the time of the print request from the host computer or terminal on the network, and checks whether or not that page data will fit into the maximum processing data amount of the video graphics processing unit (e.g., 1500 pixels by 2000 pixels as a maximum window size). In the event that the page data does not fit within the maximum window size, in step 803 the video graphics processing unit 302 divides the page data into several segments, as with the example shown in FIG. 12 wherein the data is divided into six segments with 600 DPI resolution at the letter size shown therein. It should be apparent that the data may be divided, or segmentized, otherwise, for example, into four segments using 400 DPI resolution. In this case, the video graphics processing unit 302 determines the optimal number of divisions and segment size based on the printing size, resolution, valid image area, and contents of the page data to be divided.

In step 804, the video graphics processing unit 302 extracts the portion data of the page data corresponding to the segment to be processed from the GDI format data stored in the buffer area of the memory 308, and assigns tag information made up of page information and segment position information to that segment data. Then, in step 805, the video graphics processing unit 302 renders (rasterizing processing) the bit map image data according to the object contents of the extracted data, and in the event that in step 806 the segment data contains color data (in this case, the format is GDI, so the color data is RGB), the RGB color data is converted to CMYK color data (at this time, processing such as color correction and the like is also executed, so that the CMYK data will be optimally printed with the present printer). The conversion processing in step 806 is well known, with conversion processing being executed by referring to a color conversion table. The bit map image of the segment converted by the above processing is temporarily stored in the RAM 306 in step 807, an activation request for the assembler processing task shown in step 714 in FIG. 7 is output to the processor 303, and processing is performed by the assembler processing task activated by this activation request. In step 808, the video graphics processing unit 302 judges whether or not the data for all segments has been processed (i.e., the data processing for one page has been completed), and in the event that there is segment data remaining to be processed, the flow returns to step 804 and continues the above processing. At the point that the data processing of one page is completed, the video graphics processing unit 302 in step 809 judges whether or not the page rendering processing has been completed for all file data, and in the event that there is page data remaining to be processed, the flow returns to step 801, and continues the processing the same as described above.

Also, depending on the GDI format data, there is data wherein page breaks are not defined to begin with, and in such cases, the video graphics processing unit 302 calculates data of a printing size as page data in step 802, and thus extracts page data.

Also, the bit map image data divided into several segments by the video graphics processing unit 302 and provided in increments of segments is synthesized by the assembler processing task (step 714 in FIG. 7, and FIG. 11) according to the tag information assigned at the time of dividing into segments, and stored in the bit map image data area of the corresponding page in the memory 308, following which, at the point that the bit map image data of that page data is prepared and the print engine is in a printable state, a transfer processing task of the printing data from the controller unit to the engine-controller unit 101 is activated by the assembler processing task (i.e., the data transfer processing shown in FIG. 4 is executed), and data transfer to the engine-controller unit 101 is performed using the DMA controller 304 via the printer interface unit 309.

Figure 9:
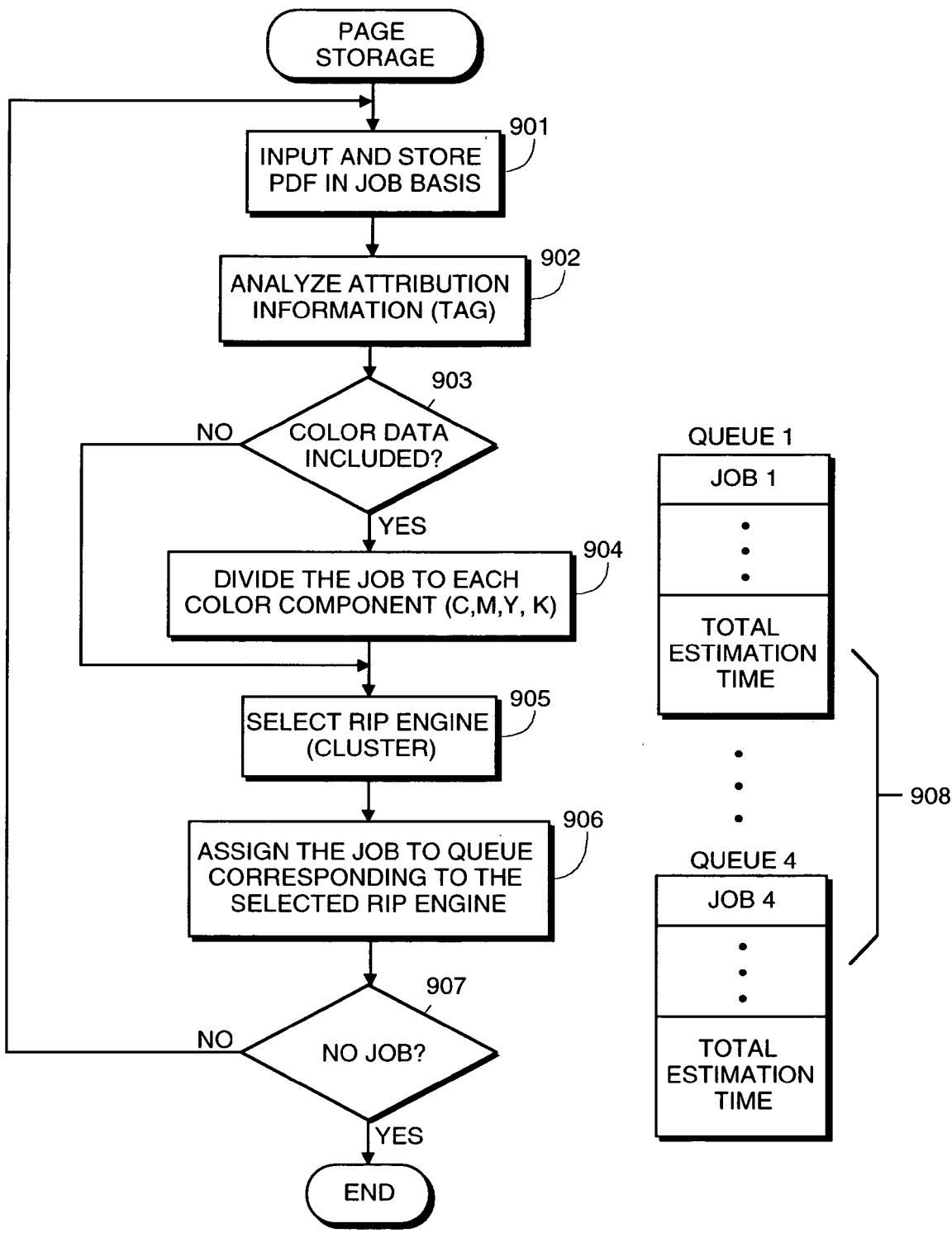

FIG. 9 is a flowchart illustrating the detailed processing of the page storage processing task executed by the processor 303.

In step 901, the processor 303 reads out the PDF data in increments of jobs (objects) stored in the buffer area of the memory 308 while making reference to attribution information including the data structure information, and in step 902 analyzes the attribution information (tag information) of the job. Then, the processor 303 judges whether or not the job contains an object with color data (e.g., data defined by at least one of C, M, or Y colors, or in the case of RGB data, data containing at least one of R, G, B colors), and in the event that the job contains a color data object, in step 904 the processor 303 separates the color data object into color components, thus dividing the job into jobs made up of one color component each. Thus, jobs containing color data objects are divided into jobs of the color components, and black/white data jobs are left untouched.

In step 905, the processor 303 checks the accumulated processing estimation time in the queues provided corresponding to the RIP engines as described above (the time required for the rasterizing processing for the jobs appropriated to the RIP engines to be completed), shown in 908 in FIG. 9, selects the queue with the smallest processing estimation time (i.e., selects a RIP engine), and in step 906 stores the job to the selected queue. Then, the processor 303 judges in step 907 whether or not assignment of all jobs of the received PDF data has been completed, and in the event that there are jobs remaining to be assigned, the flow returns to step 901, and the above processing is continued.

Figure 10:
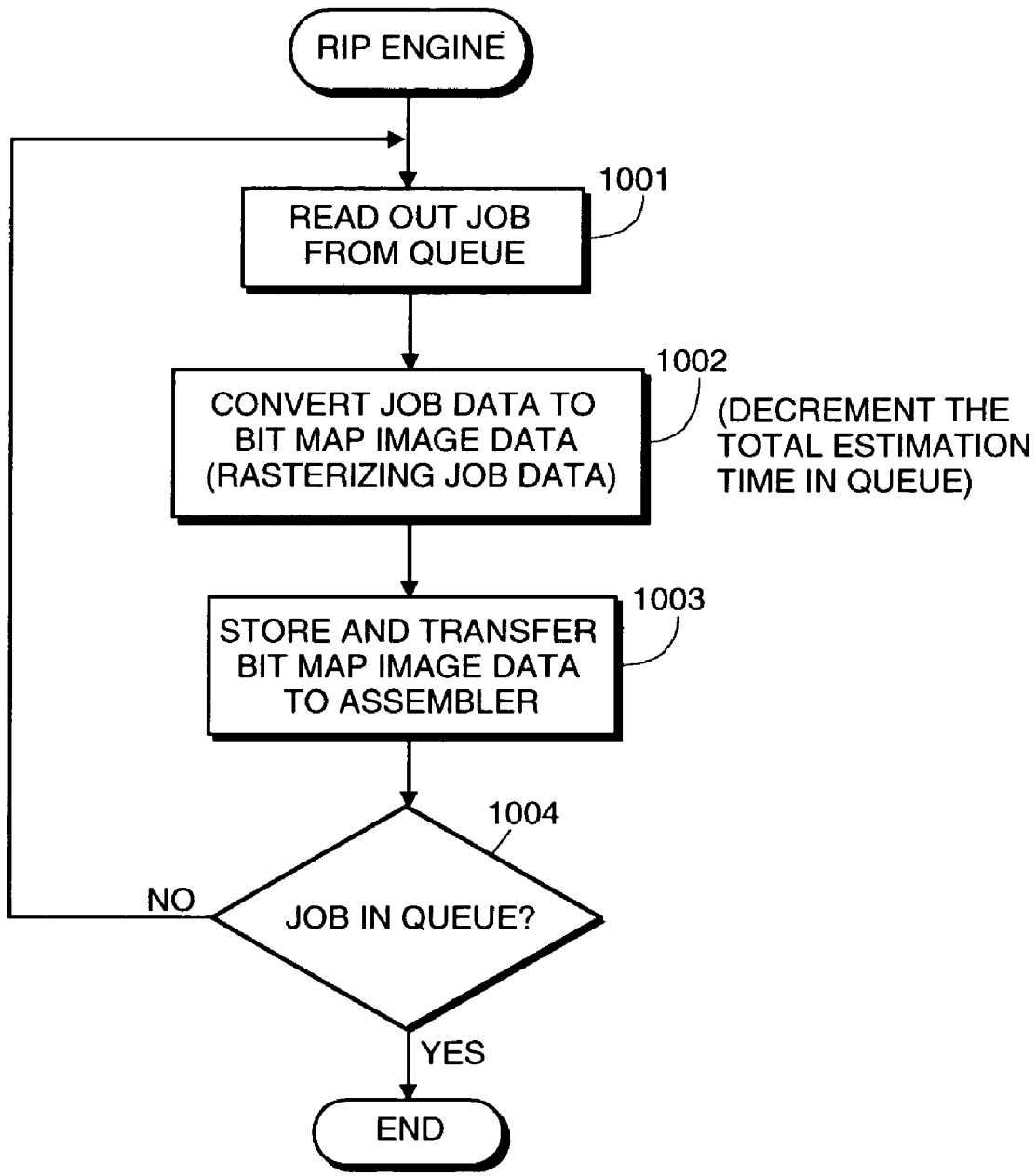

FIG. 10 is a flowchart illustrating the rasterizing processing executed by the RIP engines, and the processing by the RIP engines is executed by the clusters 1, 2, 3, and 4 of the processor 303, as described above.

The RIP engines are activated by the processor 303 at the point that jobs (PDF data) corresponding to each queue are appropriated thereto, in step 1001 each RIP engine executes the rendering processing (rasterizing processing) of the job data to bit map image data following the command information within the attribution information (tag information) of the job appropriated from the corresponding queue, in step 1003 the rendered bit map image data is temporarily stored in the work area of the RAM 306 and an assembler processing task activation request is made to the processor 303, and the processing of the rendered bit map image data is handed to the assembler processing task. Then, upon completing the rasterizing processing of one job, the RIP engine deletes that job from the corresponding queue, in step 1004 judges whether or not there are jobs stored which are assigned to the corresponding queue (i.e., jobs to be executed), and in the event that a job is assigned to the queue, the flow returns to step 1001 and the rasterizing processing of that job is continued. Incidentally, the accumulated estimation time within the queue is continuously decreased along with the execution of the rasterizing processing, while the rasterizing processing is being executed.

As described above, multiple RIP engines can be effectively run in the event that multiple jobs are assigned to the queues, by the RIP engines subjecting the assigned jobs to rasterizing processing continuously, thereby realizing high speed processing as an overall process.

Figure 11:
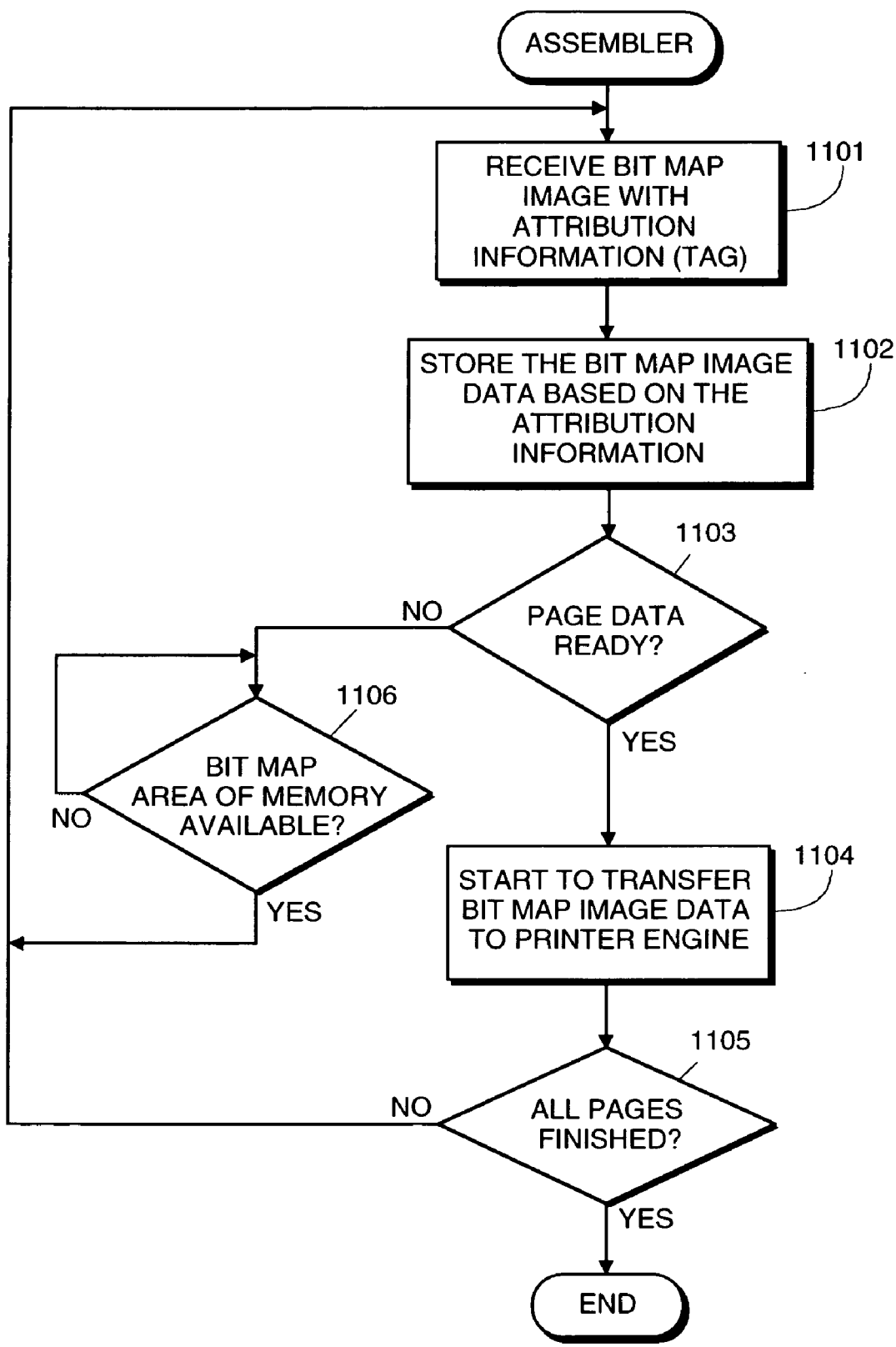

Also, FIG. 11 is a flowchart illustrating the processing of the assembler processing task executed by the processor 303.

This assembler processing task is activated and executed in response to activation requests from the XML formatter processing task, video graphics processing by the video graphics processing unit 302, and the RIP engines.

The processor 303 in step 1101 causes the bit map image data rendered by the processing tasks or RIP engines to be handed along with the attribution information (tag information), and in step 1102 the bit map image data received at a specified position within the page corresponding to the bit map image data area in the memory 308 (i.e., temporarily stored in the work area of the RAM 306) is stored, based on the page number information in the attribution information and the position information of the bit map image data.

Then, the processor 303 in step 1103 checks whether the page data (bit map image data) has been prepared; in the event that there is one set of page data completed, page ready information is written to the management information of that page and the flow proceeds to step 1106, at step 1106 judgement is made regarding whether or not there is available area in the bit map image data area in the memory 308, in the event that there is available area the flow proceeds to step 1101, and receives and processes the bit map image data from the processing tasks or the RIP engines.

Incidentally, the processor 303 in step 1103 checks whether or not a print completed notification has been received from the engine-controller unit 101 for the previous page, and in the event that a print completed notification has been received, the page management information is updated and the bit map image data area corresponding to that page is released, following which whether or not the page to be printed is set to ready or not is checked following the page management information, and in the event that the page is set to ready, the transfer processing task for transferring the print data to the engine-controller unit 101 is activated in step 1104. The data transfer processing shown in FIG. 4 is executed in this transfer processing task. Then, the processor 303 judges in step 1105 whether or not all pages of the received file data have been printed, and in the event that there are pages to be printed, the flow returns to step 1101.

It is described herein that engine-controller unit 101 receives, and the RIP engines process, C, M, Y and K color data. Typically, printers are standardized to accept color data in the CMYK color space. However, it is also contemplated that color data in other color spaces may be used with the present invention with conversion to an appropriate color space at some point prior to transmission to engine-controller unit 101. It is therefore contemplated that the RIP engines may process color data in any color space with the data being converted to an appropriate color space for printing by the printer.

In one aspect of the invention, the RIP engines receive color data in the same color space as that expected by engine-controller unit 101. In such a case, any needed conversion may be performed by host computer software (e.g., printer driver software) prior to transmission by a host computer. In a case that CMYK color data is sent by a host computer, printer driver software may convert color data from one color space to the CMYK color space by converting to none or more intermediate color spaces. For example, the driver software may convert color data between the RGB color space and CMYK color spaces. In converting from YCbCr color space to the CMYK color space, the printer driver software may first convert to the RGB color space before converted to the CMYK color space.

In another aspect of the invention, conversion to an appropriate color space is performed by controller unit 102 either prior to or after rasterization by the RIP engines. In a case that conversion is performed prior to rasterization, page storage 505 converts the color data to an appropriate color space as well as allocate each color component of the converted data in an object to each RIP engine. Page storage 505 may perform conversions such as those described above with reference to printer driver software.

Color data may also be converted post-rasterization. In such a case, bit map color data output by the RIP engines is converted from its current color space to the appropriate color space before it is transmitted to engine-controller 101. For example, assembler 510 stores bit map image data output by the RIP engines (e.g., RGB image data) in the page buffer area of memory 308. Assembler 510 converts the stored color data to the appropriate color space before the color data is transmitted to engine-controller 101.

FIGS. 13 through 16 are diagrams illustrating examples of jobs being assigned to the RIP engines in the event that the above-described PS format or PDF data is subjected to rasterizing processing with multiple RIP engines.

Figure 13:
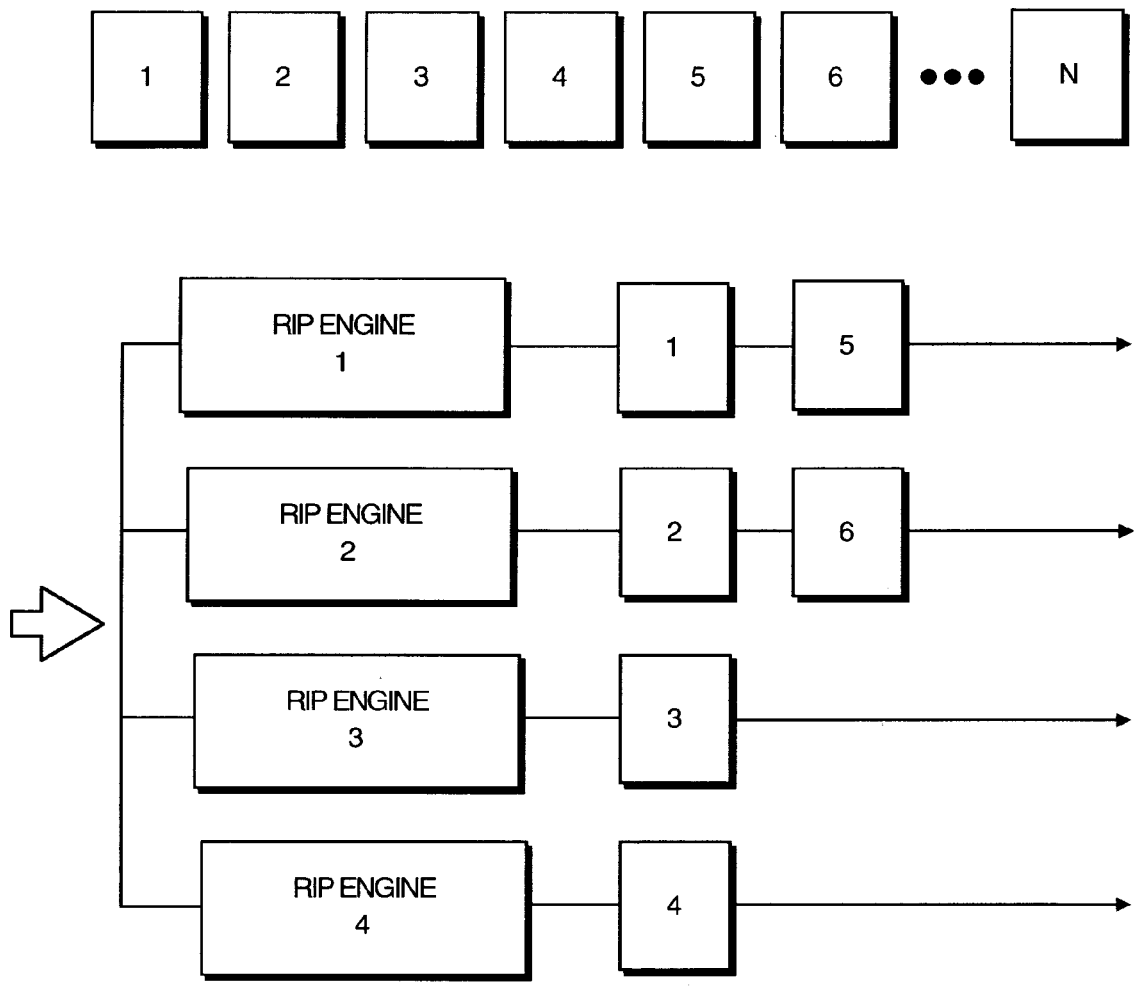
FIGS. 13 through 16 are diagrams illustrating examples wherein the jobs (objects) are appropriated to the RIP engines in the event that rasterizing processing is to be carried out by multiple RIP engines of the processor 303 of the controller unit according to the present embodiment.

FIG. 13 illustrates a state wherein rasterizing processing is to be performed for black and white PS or PDF data with each page of a plurality of pages being configured of a single job (object), wherein jobs are appropriated to multiple RIP engines (in this case, one job corresponds to one page). In this case, Page 1 through Page 4 are subjected to rasterizing processing in parallel.

Figure 14:
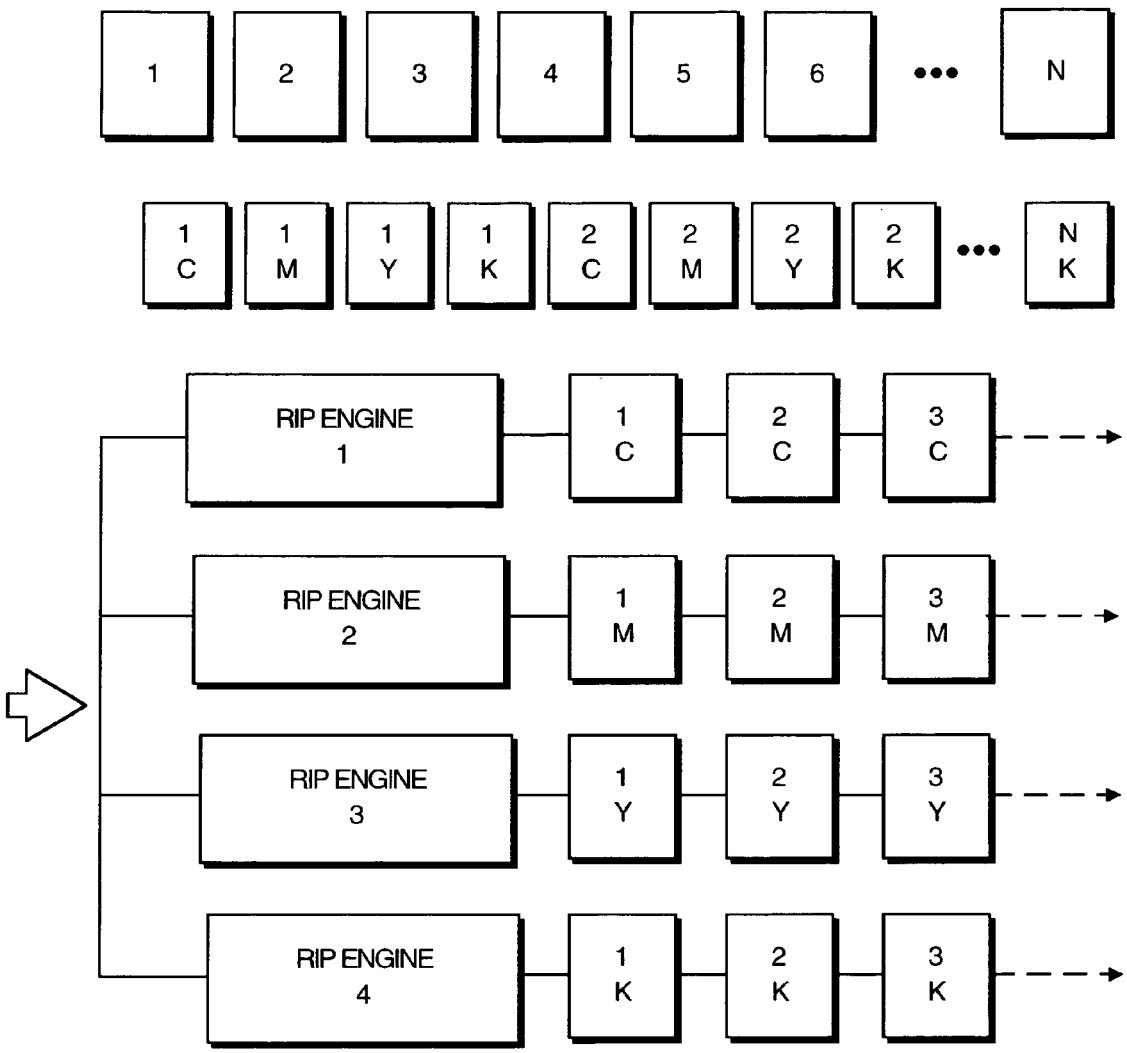

FIG. 14 illustrates a state wherein rasterizing processing is to be performed for data with each page of a plurality of pages being configured of a single job (on object containing color data), wherein jobs are appropriated to multiple RIP engines. In this case, each job for each page is divided into multiple jobs of the color components making up that job (object), and appropriated to the RIP engines.

Figure 15:
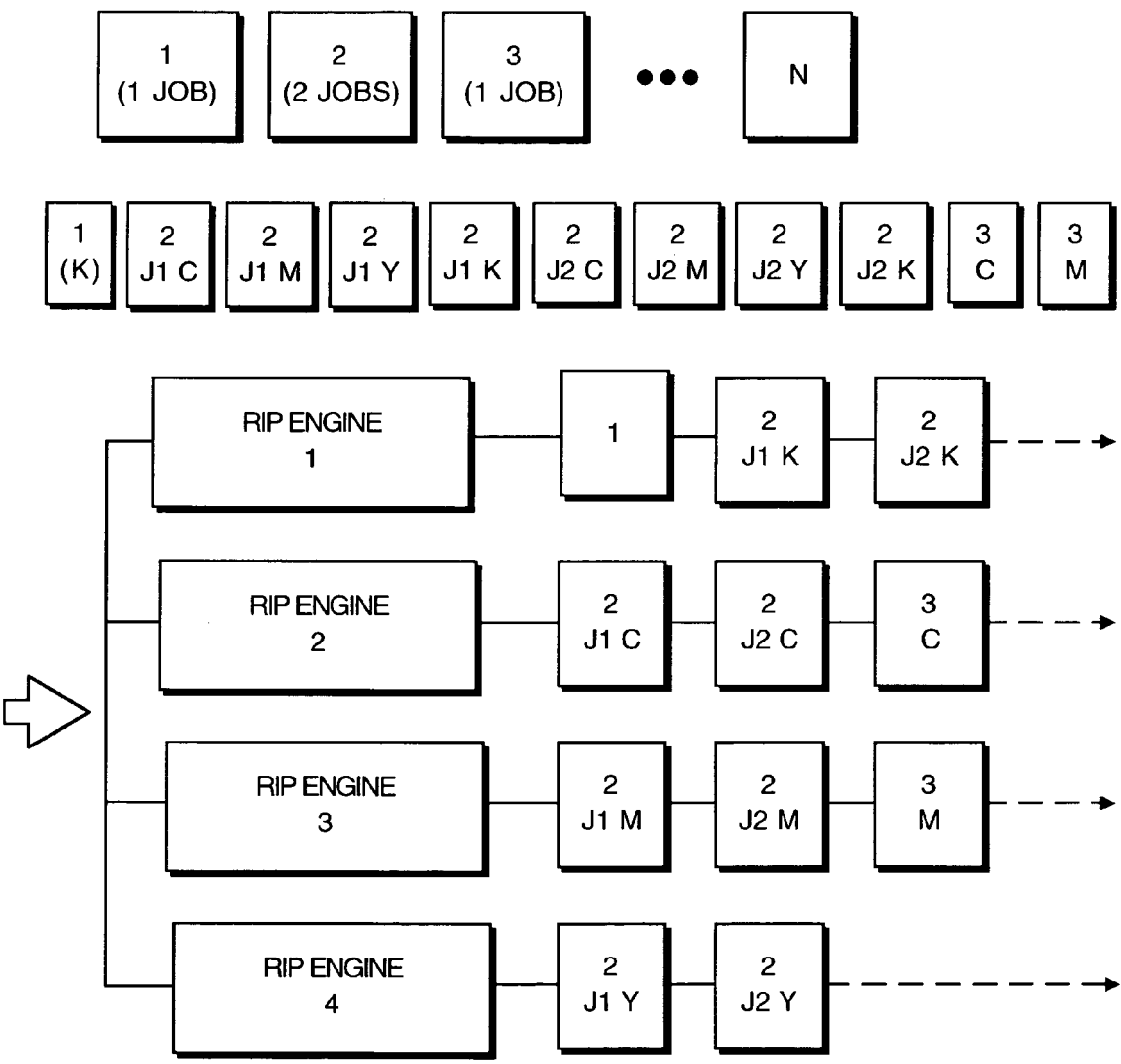

FIG. 15 illustrates a state wherein rasterizing processing is to be performed for data of a plurality of pages, wherein Page 1 is made up of one black and white data job, Page 2 is made up of two jobs each containing color data of CMYK, and Page 3 is made up of one black and white data job, with the jobs being appropriated to the RIP engines.

Figure 16:
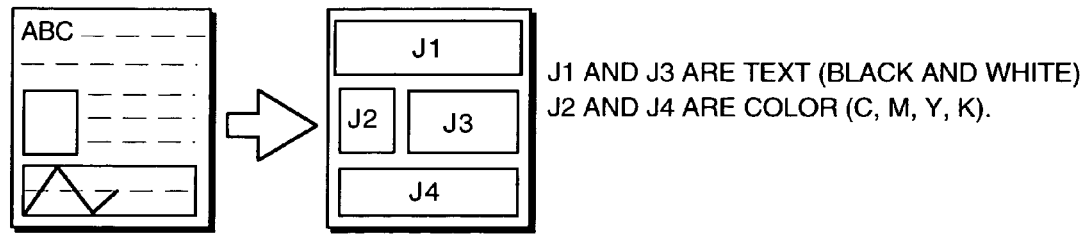
Figure 16:
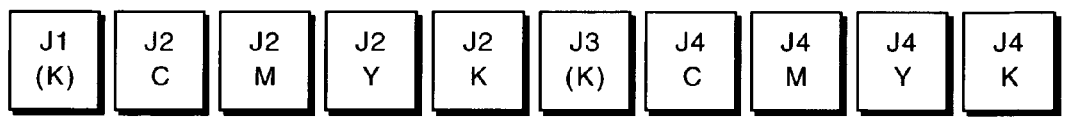
Figure 16:
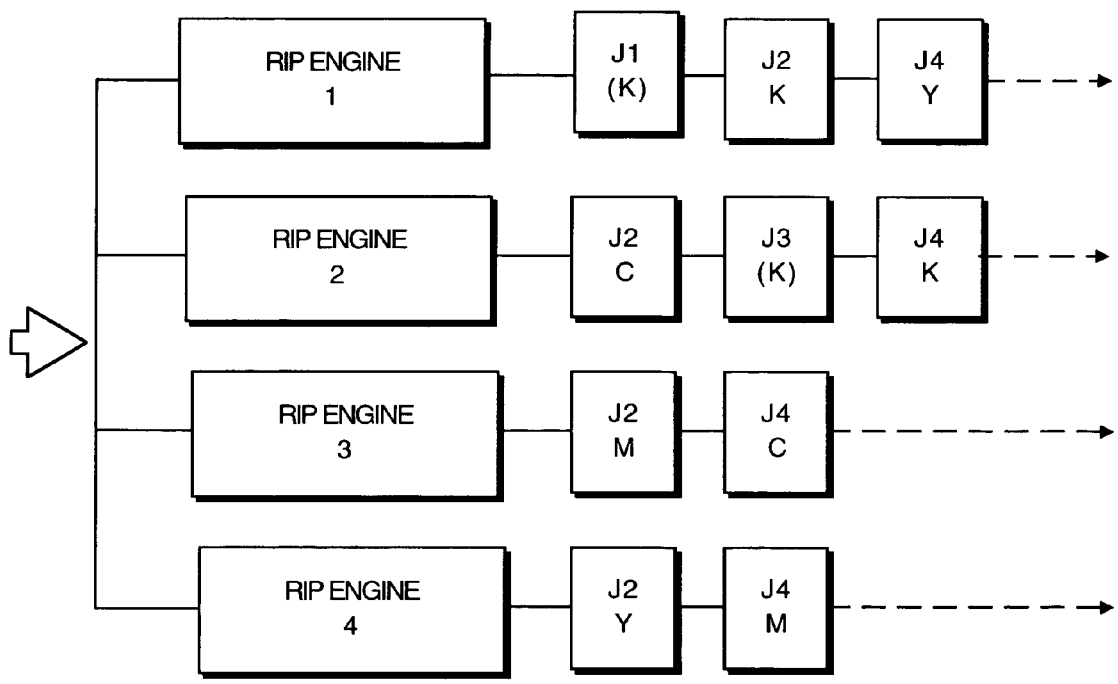

FIG. 16 illustrates a state wherein one page of data is made up of four jobs each containing CMYK color data, and the jobs are appropriated to the RIP engines.

As illustrated in FIG. 2 with the above-described embodiment, one vertical synchronizing signal line is used as a vertical synchronizing signal line from the engine-controller unit 101 to the controller unit 102. Here, following the input of reference vertical synchronizing signal and output of the yellow image data, the controller 102 sequentially outputs the magenta image data, cyan image data, and black image data, after passage of a certain amount of time. However, the configuration may be arranged so as to be such as that of a second embodiment.

With the second embodiment, color deviation amount measurement is performed beforehand at the engine-controller unit, the time difference in the image data input timing where the color deviation amount is minimal is calculated, and the time difference in the image data input timing is communicated to the controller unit via serial communication.

Figure 17:
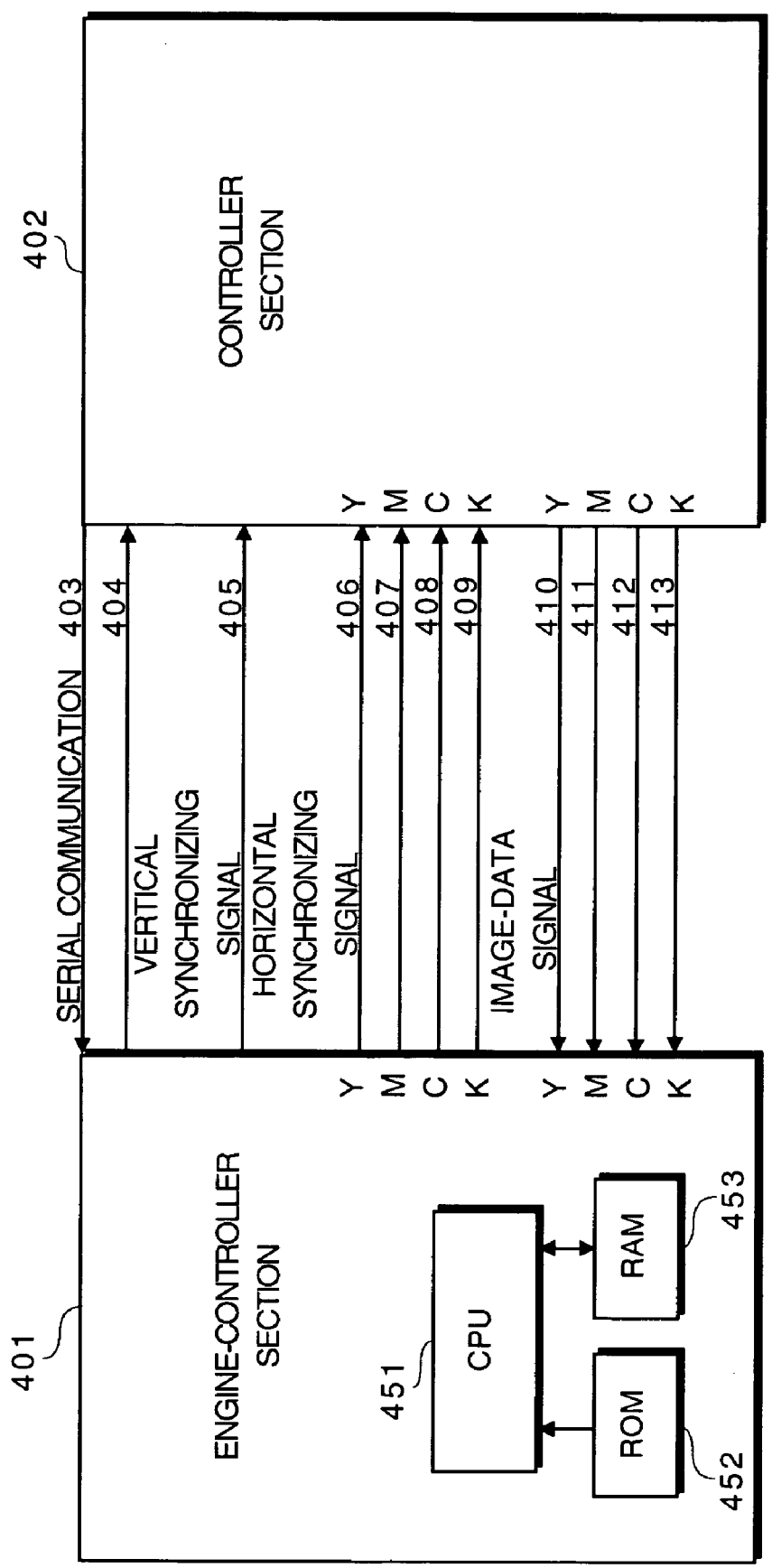
FIG. 17 is a diagram illustrating the connection wiring between the engine-controller unit and the controller unit of a second embodiment according to the present invention.

FIG. 17 shows signal lines to be used for transmitting and/or receiving various types of control signals and data between the engine-controller unit 401 and the controller unit 402 of the first embodiment.

In FIG. 17, the symbol 403 denotes a serial command signal line for transmitting command signals through serial communication from the controller unit 402 to the engine-controller unit 401. The symbol 404 denotes a serial status signal line for transmitting status signals through serial communication from the engine-controller unit 401 to the controller unit 42 in response to commands. The symbol 405 denotes a reference vertical synchronizing signal line for transmitting vertical synchronizing signals from the engine-controller unit 401 to the controller unit 402.

The symbol 406 denotes a Y horizontal synchronizing signal line for transmitting horizontal synchronizing signals for yellow colors from the engine-controller unit 401 to the controller unit 402. The symbol 407 denotes an M horizontal synchronizing signal line for transmitting horizontal synchronizing signals for magenta colors from the engine-controller unit 401 to the controller unit 402. The symbol 408 denotes a C horizontal synchronizing signal line for transmitting horizontal synchronizing signals for cyan colors from the engine-controller unit 401 to the controller unit 402. The symbol 409 denotes a K horizontal synchronizing signal line for transmitting horizontal synchronizing signals for black colors from the engine-controller unit 401 to the controller unit 402.

The symbol 410 denotes a Y image-data signal line for transmitting yellow-color image data signals from the controller unit 402 to the engine-controller unit 401. The symbol 411 denotes an M image-data signal line for transmitting magenta-color image data signals from the controller unit 402 to the engine controller unit 401. The symbol 412 denotes a C image-data signal line for transmitting cyan-color image data signals from the controller unit 402 to the engine-controller unit 401. The symbol 413 denotes a K image-data signal line for transmitting black-color image data signals from the controller unit 402 to the engine-controller unit 401.

The engine-controller unit 401 has a CPU 451, a ROM 452, and a RAM 453, in which the CPU 451 executes various types of processing described below by using the RAM 453 as areas such as a work area and the like according to a program stored in the ROM 452.

Figure 18:
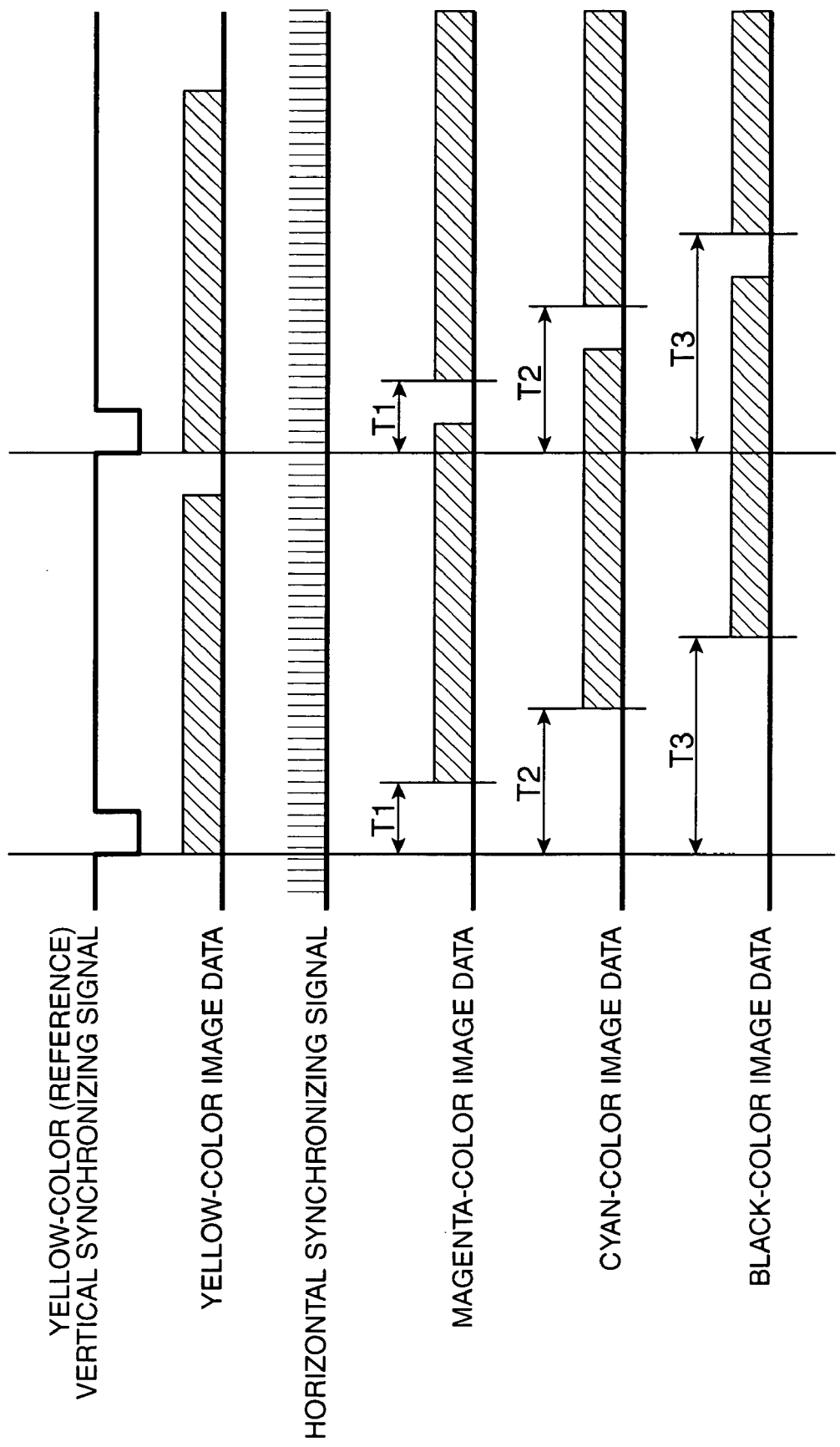
FIG. 18 is a timing chart illustrating the processing for transferring image data (bit map image data) from the controller unit to the engine-controller unit with the second embodiment.

The controller unit 402 also has the same configuration shown in FIG. 3, of a media processor 301, interface unit 307, and memory 308, with the printer interface unit having connection lines as shown in FIG. 17, and the image data transfer processing from the controller unit 402 to the engine-controller unit 401 being altered as shown in FIG. 18. Incidentally, the control programs for executing the transfer processing of image data in this second embodiment are also stored in the ROM 305 of the media processor 301.

In the present embodiment, before a printing operation is performed, the controller unit 402 issues a color-deviation-compensation-amount-measuring command to the engine-controller unit 401 via the serial command signal line 403. The color-deviation-compensation-amount-measuring command commands the recipient to measure a time difference in image-data-input timing for each color for minimizing the color deviation for each color from the reference vertical synchronizing signal. The color-deviation-compensation-amount measurement may be executed when the amount of color deviation is considered to be different from the previous measurement time, for example, immediately after a power switch is turned on and when a toner package is replaced by a user.

Upon the receipt of the color-deviation-compensation-amount-measuring command from the controller unit 402, the engine-controller unit 401 measures the amount of color deviation that occurs due to a positional deviation and the like that occurs in the image-forming unit for each color. It also calculates time that must be deviated in output timing of image data for each color from the reference vertical synchronizing signal to minimize the color deviation. The engine-controller unit 401 transmits a completion status of color-deviation-compensation-amount measurement to the controller unit 402 via the serial status line 404.

Subsequently, the controller unit 402 requests the engine-controller unit 401 via the serial command signal line 403 to transmit response-data on a difference in time from the reference vertical synchronizing signal (yellow-color vertical synchronizing signal) to magenta-color-image-data input timing. In response to the request, the engine-controller unit 401 transmits the data on the difference in time between the reference vertical synchronizing signal and the magenta-color-image-data input timing to the controller unit 402 via the serial status line 404. Similarly, from the engine-controller unit 401, the controller unit 402 fetches data on differences in time between the reference vertical synchronizing signal and image-data-input timing for the individual cyan and clack colors.

In the described configuration, upon receipt of a print-start command from, for example, a host computer (not shown), the controller unit 402 issues a printing-operation-start command to the engine-controller unit 401 via the serial command signal line 403. Upon the receipt of the printing-operation-start command, the engine-controller unit 401 commands the image-forming unit to start a printing operation and transmit a signal representing the information about the start of the printing operation via the serial status line 404.

The printing operation is started by starting rotation of the drum-driving motors for rotationally driving the aforementioned photosensitive drums for the individual colors, the belt-driving motor for rotationally driving the intermediate transcribing belt 619, and the polygon-mirror driving motors 104, 110, 111, and 112 that correspond to the individual colors.

Subsequently, when the number of revolutions of each of the polygon-mirror driving motors 104, 110, 111, and 112 reaches the level of a stationary number of revolutions, the engine-controller unit 401 outputs a vertical synchronizing signal (reference vertical synchronizing signal) and a horizontal synchronizing signal for a first color of yellow to the controller unit 402, respectively, via the reference vertically-synchronizing signal line 405 and the Y vertical synchronizing signal line 406. In synchronization with the vertical synchronizing signal and the horizontal synchronizing signal, the controller unit 402 outputs a yellow-color image data signal (in specific, the signal is a laser-beam ON/OFF signal) to the engine-controller unit 401 via the Y image-data signal line 410.

As a result of the above, the following image-forming operations are performed under the control of the engine-controller unit 401. Under the control of the engine-controller unit 401, the Y laser-beam scanning system 103 for yellow colors emits a laser beam according to the image data inputted from the controller unit 402 and forms an electrostatic latent image corresponding to the yellow color onto the photosensitive drum 105. Then, using magenta toner, the Y developing unit 106 produces a visual image from the electrostatic latent image on the Y photosensitive drum 105; and the Y primary transcribing section 129 primarily transcribes the yellow-color visual image on the Y photosensitive drum 105 onto the intermediate transcribing belt 119.

With timing when the yellow-toner visual image transcribe onto the intermediate transcribing belt 119 passes the lowest point of the M photosensitive drum 113 for magenta colors, the controller unit 402 outputs yellow-color image data; and after a preliminarily fetched time (T1 shown in FIG. 4) between the reference vertical synchronizing signal and magenta-color image-data-data input timing passes; it outputs magenta-color image data to the engine-controller unit 401 via the M image-data signal line 411 so that a magenta-toner visual image arrives at the lowest point of the M photosensitive drum 113 for magenta colors.

Subsequently, the M laser beam scanning system 407 for magenta colors emits a laser beam according to the image data inputted from the controller unit 402 and forms an electrostatic latent image corresponding to the magenta color onto the M photosensitive drum 113. Then, using magenta toner, the M developing unit 116 produces a visual image from the electrostatic latent image formed on the M photosensitive drum 113. Subsequently, the M primary transcribing section 130 arranges the magenta-color visual image formed on the M photosensitive drum 113 to be completely overlapped with the yellow-color visual image, then primarily transcribes the images onto the intermediate transcribing belt 119.

Similarly, the controller unit 402 individually outputs cyan-color image data and black-color image data after preliminarily obtained times (T2 and T3 shown in FIG. 4) between the reference vertical synchronizing signal and output timing individually pass so that individual images are properly overlapped with the images in other colors and the overlapped images are transcribed onto the intermediate transcribing belt 119.

To feed a recording sheet from the feeding-sheet cassette 120 according to the sheet-feeding roller 121, the engine-controller unit 401 allows the recording sheet to be fed with timing so that the end of the image (including a margin area) formed on the intermediate transcribing belt 119 arrives just at the end of the recording sheet and the image on the intermediate transcribing belt 119 is secondarily transcribed properly onto the recording sheet by the secondary transcribing roller 122.

MODIFIED EXAMPLES OF THE FIRST AND SECOND EMBODIMENTS

According to the second embodiment, the difference in time between the reference vertical synchronizing signal and the image-data-output timing for each of the colors is represented by an absolute numeric value, and the absolute numeric value is transmitted from the engine-controller unit 401 to the controller unit 402. In this case, however, when the time difference between the reference vertical synchronizing signal and the image data for each of the colors is transmitted, for example, in the unit of sec. or the like, the numeric value becomes very large. Thus, since the value is too large to be transmitted through one time of serial communication, it is divided into several blocks of bits so as to be transmitted in plural times. Therefore, the transmission requires a long time, thereby increasing time required to start the printing operation.

To solve this problem, an arrangement may be such that the difference in time between the reference vertical synchronizing signal and the image-data input timing for each of the colors is set by the number of input times (the number of inputs) for the horizontal synchronizing signals after the reference vertical synchronizing signal is inputted to the controller unit 402. This reduces the numeric value to be transmitted, thereby reducing the number of bits to be transmitted through serial communication. An alternative arrangement may be such that neither the time difference according to the second embodiment nor the aforementioned number of input times is not transmitted, but only a numeric value representing the difference from a certain value is instead transmitted. This further reduces the numeric value to be transmitted, thereby allowing reduction in the number of bits to be transmitted through serial communication.

In an arrangement in which the difference in time between the reference vertical synchronizing signal and the image-data-output timing for each of the colors is digitally set by the number of input times for the horizontal synchronizing signals, since frequency of the horizontal synchronizing signal is very high, color deviation is not caused for the particular reason that the value is digitally set.

What is claimed is:

1. An image processing method in a printing system receiving file data from an external terminal, converting the received file data to bit map image data by a plurality of processors, each processor performing a conversion process of an assigned job to bit map image data, and providing a plurality of pages of bit map image data in order to a printing engine, the printing engine printing the provided page of the bit map image data at a constant speed on a recording medium, the image processing method comprising the steps of:

receiving a page description language format of data including attribution information from the external terminal, the attribution information indicating at least a data structure of plural pages in the received data and type of objects which constitutes the page description language format data;

analyzing the attribution information included in the received page description language format data to segment a page into objects defined by the page description language format data;

independently assigning each object in the received page description language format data to a respective one of the plurality of processors as jobs of conversion processes converting the object into image data to a completion of the conversion processes for one page;

receiving bit map image data of each job from the plurality of processors without regard to a page order and storing the received bit map image data from the plurality of processors into a memory having a memory capacity for storing plural pages of bit map image data; and reconstructing the bit map image data stored in the memory in page order to the printing engine.

2. An image processing method according to claim 1, wherein, in a case of assigning one object to one processor, said assigning step selects one of the plurality of processors, which finishes a conversion process of the object to raster image data earlier than others.

3. An image processing method according to claim 2, wherein each processor having a queue for storing assigned objects as jobs of conversion processes, and said assigning step assigns each object to one of the queues of the processors, and each processor performs the conversion process based on information of the job stored in the queue.

4. An image processing method according to claim 3, wherein each queue includes information indicating estimation time required in completing the assigned jobs by each processor, and wherein said assigning steps selects one of the plurality of processors, which the estimation time in the queue is shorter than others.

5. An image processing method according to claim 1, wherein the printing system having a conversion unit converting, into bit map image data, file data other than the page description language format data, and wherein, in a case where the file data received is other than the page description language format data, said analyzing step judges, based on attribution information included in the received file data, a format of the received data, and said assigning step assigns a job of the conversion process of the received file data to the conversion unit.

6. An image processing method according to claim 5, wherein the file data is judged to be of a Graphic Display Interface (GDI) format by said analyzing step.

7. An image processing method according to claim 5, wherein the file data is judged to be of an Extensible Markup Language (XML) format by said analyzing step.

8. An image processing method according to claim 6, wherein the conversion unit includes a video-graphics processing unit processing data for display, the video-graphics processing unit providing bit map image data of a predetermined size, and wherein the conversion unit divides a page of data in the file data into a plurality of segments, and converts the segment data into bit map image data, and said reconstructing step combines the bit map image data of the plurality of segments into the page of bit map image data.

9. An image processing method according to claim 5, wherein the conversion unit assigns tag information into each segment data, and wherein said reconstructing step performs the combining process based on the tag information.

10. An image processing method according to claim 1, wherein the printing system comprises a printing engine for continuously receiving color image data having at least three color components in page unit and for printing the at least three color components of color image data on a recording medium in parallel at a constant speed, wherein said receiving step receives a page description language format of data including at least two of the at least three color components as at least an object constituting the page description language format data, and wherein said assigning step divides the object of the at least two color components into each color component data, and assigns each color component data as an independent job to at least two of the plurality of processors so that the two processors independently convert the at least two color component data into bit map image data of the at least two color components in parallel.

11. An image processing method according to claim 1, wherein the assigning step further comprises segmenting the objects into color component data, so that a job is segmented into each set of object and color component.

12. An image processing method according to claim 7, wherein the Extensible Markup Language (XML) formatted data is processed by an XML formatter, so that the XML data is converted to bit map image data.

13. A printer controller apparatus including a plurality of parallel developing means for developing print data into image data, comprising:

receiving means for receiving a plurality of pages of print data, said plurality of pages having a designated order;

generating means for generating a plurality of object data and a plurality of component data corresponding to each color component of the object data from each page of print data received from said receiving means;

first control means for controlling said plurality of parallel developing means, said first control means assigning said color component data and said object data generated by said generating means to said plurality of developing means according to the object data and to a respective type of said corresponding color component data, said plurality of parallel developing means generating image data from the color component data and the object data;

means for storing said image data generated by said plurality of parallel developing means independent of said page order; and second control means for controlling output of said stored image data on a printing apparatus based on said page order.

14. A printer controller apparatus according to claim 13, wherein said second control means controls output of said image data based on an ordering of colors to be outputted on said printing apparatus.

15. A printer controller apparatus according to claim 13, wherein said generating means generates component data corresponding to a color component and an object by page.

16. A printer controller apparatus according to claim 13, wherein said generating means divides each page into at least two objects and generates component data corresponding to a color component for each object.

17. A printer controller apparatus according to claim 13, while at least one of said plurality of parallel developing means is processing component and object data of one page, said first control means assigns component and object data of another page to unused ones of said plurality of parallel developing means.

18. A printer controller apparatus according to claim 13, wherein said receiving means receives print data for more than one print job, and wherein while at least one of said plurality of parallel developing means is processing component and object data of one print job, said first control means assigns component and object data of another print job to unused ones of said plurality of parallel developing means.

19. A print controller apparatus according to claim 13, wherein said plurality of parallel developing means is executed by one processing unit.

* * * * *

UNITED STATES PATENT AND TRADEMARK OFFICE
CERTIFICATE OF CORRECTION

PATENT NO. : 7,072,052 B1
APPLICATION NO. : 09/621783
DATED : July 4, 2006
INVENTOR(S) : Junichi Tanahashi et al.

It is certified that error appears in the above-identified patent and that said Letters Patent is hereby corrected as shown below:

COLUMN 3
        Line 21, "section;" should read --section);--;
        Line 47, "and" should read --an--; and
        Line 48, "and" should read --an--.

COLUMN 4
        Line 42, "color unit" should read --color image data signals from the controller unit 102 to the engine-controller unit--.

COLUMN 5
        Line 8, "cyan-color" should read --cyan-color image--; and
        Line 48, "on to" should read --onto--.

COLUMN 6
        Line 6, "transcribe" should read --transcribed--;
        Line 25, "reduces" should read --reduced--; and
        Line 28, "and" should read --an--.

COLUMN 7
        Line 56, the first occurrence of "as" should be deleted.

COLUMN 11
        Line 5, "of" should be deleted; and
        Line 62, "of" should be deleted.

COLUMN 16
        Line 14, "converted" should read --converting--.

COLUMN 18
        Line 36, "clack" should read --black--.

COLUMN 19
        Line 8, "magenta" should read --yellow--.

UNITED STATES PATENT AND TRADEMARK OFFICE
CERTIFICATE OF CORRECTION

PATENT NO. : 7,072,052 B1
APPLICATION NO. : 09/621783
DATED : July 4, 2006
INVENTOR(S) : Junichi Tanahashi et al.

It is certified that error appears in the above-identified patent and that said Letters Patent is hereby corrected as shown below:

COLUMN 22
Line 59, "print" should read --printer--.

Signed and Sealed this

Twenty-sixth Day of December, 2006

JON W. DUDAS
*Director of the United States Patent and Trademark Office*